US009280986B2

(12) United States Patent
Hashimoto et al.

(10) Patent No.: US 9,280,986 B2
(45) Date of Patent: Mar. 8, 2016

(54) ACOUSTIC SIGNAL PROCESSING DEVICE AND ACOUSTIC SIGNAL PROCESSING METHOD

(71) Applicant: CLARION CO., LTD., Saitama-shi (JP)

(72) Inventors: Takeshi Hashimoto, Motomiya (JP); Tetsuo Watanabe, Hasuda (JP)

(73) Assignee: CLARION CO., LTD., Saitama-Shi (JP)

( * ) Notice: Subject to any disclaimer, the term of this patent is extended or adjusted under 35 U.S.C. 154(b) by 0 days.

(21) Appl. No.: 14/381,989

(22) PCT Filed: Jan. 23, 2013

(86) PCT No.: PCT/JP2013/051273

§ 371 (c)(1),
(2) Date: Aug. 29, 2014

(87) PCT Pub. No.: WO2013/136846

PCT Pub. Date: Sep. 19, 2013

(65) Prior Publication Data

US 2015/0030171 A1 Jan. 29, 2015

(30) Foreign Application Priority Data

Mar. 12, 2012 (JP) ................................ 2012-054560

(51) Int. Cl.
*H04B 3/20* (2006.01)
*G10L 21/057* (2013.01)
(Continued)

(52) U.S. Cl.
CPC ............ *G10L 21/057* (2013.01); *G10H 1/0091* (2013.01); *G10H 1/02* (2013.01);
(Continued)

(58) Field of Classification Search
None
See application file for complete search history.

(56) References Cited

U.S. PATENT DOCUMENTS 6,532,445 B1 3/2003 Toguri et al.
7,272,556 B1 * 9/2007 Aguilar ................ G10L 19/093 704/201

(Continued)

FOREIGN PATENT DOCUMENTS

JP 2000-101439 4/2000
JP 2003-005799 1/2003

(Continued)

OTHER PUBLICATIONS

International Search Report for corresponding International Application No. PCT/JP2013/051273, Apr. 23, 2013.

(Continued)

*Primary Examiner* — Tan X Dinh
(74) *Attorney, Agent, or Firm* — Mori & Ward, LLP

(57) ABSTRACT

Provided is an acoustic signal processing device for producing an output sound meeting listener's preferences by adjusting attack sound, reverberation, and noise component. The device includes: an FFT section for transforming an input audio signal from a time-domain to a frequency-domain to calculate a frequency spectrum signal and for generating a first amplitude spectrum signal and a phase spectrum signal; an attack component controller (10) for controlling an attack component of the first amplitude spectrum signal to generate a second amplitude spectrum signal; a reverberation component controller (20) for controlling a reverberation component of the first amplitude spectrum signal to generate a third amplitude spectrum signal; a first adding section (40) for synthesizing the first amplitude spectrum signal, the second amplitude spectrum signal, and the third amplitude spectrum signal to generate a fourth amplitude spectrum signal; and an IFFT section for generating an audio signal transformed from a frequency domain to a time domain based on the fourth amplitude spectrum signal and the phase spectrum signal generated by the FFT section.

4 Claims, 13 Drawing Sheets

(51) Int. Cl.

| | |
|---|---|
| ***H04R 3/04*** | (2006.01) |
| ***G10K 11/175*** | (2006.01) |
| ***G10L 21/02*** | (2013.01) |
| ***G10H 1/02*** | (2006.01) |
| ***G10H 1/00*** | (2006.01) |
| *G10L 21/0364* | (2013.01) |
| *G10L 19/025* | (2013.01) |

(52) U.S. Cl.
CPC ............. *G10K 11/175* (2013.01); *G10L 21/02* (2013.01); *H04R 3/04* (2013.01); *G10L 19/025* (2013.01); *G10L 21/0364* (2013.01); *H04R 2227/007* (2013.01)

(56) References Cited

U.S. PATENT DOCUMENTS

| | | | | | |
|---|---|---|---|---|---|
| 7,353,169 | B1 | 4/2008 | Goodwin et al. | | |
| 7,594,423 | B2 * | 9/2009 | Padhi | G01L 23/225 | 73/114.07 |
| 7,783,488 | B2 * | 8/2010 | Ben-David | G10L 15/30 | 382/181 |
| 8,143,620 | B1 * | 3/2012 | Malinowski | H04R 3/005 | 257/56 |
| 8,706,496 | B2 * | 4/2014 | Sanjaume | G10L 19/093 | 704/200 |
| 8,804,977 | B2 * | 8/2014 | Neal | H04B 3/234 | 381/66 |
| 2006/0018486 | A1 | 1/2006 | Neoran et al. | | |
| 2008/0300869 | A1 * | 12/2008 | Derkx | G10L 21/02 | 704/226 |
| 2011/0046965 | A1 | 2/2011 | Taleb et al. | | |
| 2014/0044273 | A1 * | 2/2014 | Hashimoto | G10L 21/0232 | 381/66 |
| 2014/0177857 | A1 * | 6/2014 | Kuster | H04R 25/407 | 381/66 |

FOREIGN PATENT DOCUMENTS

| | | |
|---|---|---|
| JP | 2007-036710 | 2/2007 |
| JP | 2010-538315 | 12/2010 |
| JP | 2012-002858 | 1/2012 |

OTHER PUBLICATIONS

Supplementary European Search Report for corresponding EP Application No. 13760657.0, Oct. 5, 2015.

Japanese Office Action for corresponding JP Application No. 2012-054560, Nov. 17, 2015.

* cited by examiner

ACOUSTIC SIGNAL PROCESSING DEVICE AND ACOUSTIC SIGNAL PROCESSING METHOD

TECHNICAL FIELD

The present invention relates to an acoustic signal processing device and an acoustic signal processing method and, more particularly, to an acoustic signal processing device and method capable of performing enhancement/reduction of attack sound or reverberation in an input audio signal, reduction of noise therein, and the like.

BACKGROUND ART

Today, music is often generated using a data-compressed digital audio signal. As one of the data-compressed digital audio signal, MP3 (MPEG Audio Layer-3) is well known. The MP3 is one of compression methods for handling acoustic data using digital technology. Nowadays, the MP3 is widely used in portable music players and the like.

A popular digital audio signal such as the MP3 has a problem in that when a decompressed digital audio signal is directly subjected to analog conversion for output, attack sound (attack component) is deteriorated to damage sound quality. In order to cope with this, a digital signal processing device that amplifies a signal output of the attack sound is proposed (refer to, e.g., Patent Literature 1).

The proposed digital signal processing device compares a signal level of a predetermined frequency band extracted through a band division filter and a prescribed threshold level and detects a digital signal having a level equal to or higher than the threshold level as the attack sound. Then, the digital signal processing device amplifies the detected attack sound and synthesizes the amplified attack sound with a digital signal before band division to thereby enhance the attack sound.

As described above, the attack sound included in a predetermined frequency band can be amplified and enhanced in accordance with a signal level, so that when, for example, low-frequency attack sound is amplified, dynamism of powerful sound such as drum sound can be enhanced. When high-frequency attack sound is amplified, sound such as cymbal sound can be made clearer.

As described above, it is possible to make an output sound sharp as a whole by amplifying and enhancing the attack sound in accordance with a signal level. Thus, the proposed device can bring high effect for improvement in quality of a compressed audio signal, such as the MP3, in which the attack sound may be significantly deteriorated.

CITATION LIST

Patent Literature

Patent Literature 1: Jpn. Pat. Appln. Laid-Open Publication No. 2007-36710

SUMMARY OF INVENTION

Technical Problem

In the above-described digital signal processing device, the attack sound included in a sound source is detected based on a predetermined threshold. However, the sound source includes various amplitude levels, so that it is difficult to satisfactorily detect the attack sound based on only the threshold.

In a sound source including both musical instrument sound and voice, the amplitude of the sound source is represented by synthesizing the musical instrument sound and voice, so that it is difficult to distinguish a signal level of the attack sound of the musical instrument sound from that of the voice based on the threshold. Therefore, not only the attack sound of the musical instrument sound, but also the voice signal may be disadvantageously amplified.

Further, the musical instrument sound is composed of the attack sound at the rising of waveform and reverberation (reverberation component) that continues following the attack sound. However, the above-described digital signal processing device controls only the attack sound and does not particularly control the reverberation. Therefore, although it is possible to obtain a sharp output sound by amplifying the attack sound, there is a possibility that only the sharpness is excessively enhanced as compared to the reverberation.

Further, the above-described digital signal processing device can enhance an output sound with less reduction of an S/N ratio (signal-to-noise ratio) than a conventional amplification method using, e.g., an equalizer, in which a predetermined frequency band is uniformly amplified. However, when noise is always present in a recording environment of the sound source, especially, when stationary noise is included in an extraction band of the attack sound, the attack sound including the noise may be boosted for synthesis, which may significantly reduce the S/N ratio.

Further, in listening of music, whether the music is good or bad for a listener depends largely on listener's preferences. Thus, some listeners prefer a sharp sound, and others think that the sharp sound is annoying. Some listeners prefer sound including much reverberation components, and others do not. Some listeners prefer sound including a stationary signal component (resonance) included in the sound source itself or a stationary noise component included in a recording environment of the sound source as a sound with a sense of presence, and others prefer a clear sound. That is, only by producing a sharp sound through amplification of the attack sound using the above-described digital signal processing device, it is not easy to meet listener's various preferences (demands).

The present invention has been made in view of the above problems, and an object thereof is to provide an acoustic signal processing device and an acoustic signal processing method capable of producing an output sound meeting listener's preferences by adjusting the attack sound included in a sound source such as musical instrument sound, reverberation that continues following the attack sound, and a stationary noise component in the recording environment or a stationary signal component included in the sound source.

Solution to Problem

An acoustic signal processing device according to the present invention includes: an FFT section in which a short-time Fourier transform to an input audio signal is performed with time shifted by a differential time between a Fourier transform length and an overlap length to calculate a plurality of amplitude spectra differing in time from one another by the differential time, a time variation of each of the calculated amplitude spectrum is calculated on a per frequency basis to transform the input audio signal from a time-domain signal into a frequency-domain signal and to calculate a frequency spectrum signal, and a first amplitude spectrum signal and a phase spectrum signal are generated based on the frequency spectrum signal; an attack component controller provided for controlling an attack component of the first amplitude spectrum signal generated by the FFT section to generate a second amplitude spectrum signal; a reverberation component controller provided for controlling a reverberation component of the first amplitude spectrum signal generated by the FFT section to generate a third amplitude spectrum signal; a first adding section provided for synthesizing the first amplitude spectrum signal generated by the FFT section, the second amplitude spectrum signal generated by the attack component controller, and the third amplitude spectrum signal generated by the reverberation component controller to generate a fourth amplitude spectrum signal; and an IFFT section provided for calculating a frequency spectrum signal based on the fourth amplitude spectrum signal generated by the first adding section and the phase spectrum signal generated by the FFT section and applying an inverse short-time Fourier transform and an overlap addition to the calculated frequency spectrum signal to generate an audio signal transformed from a frequency domain to a time domain. The attack component controller includes: a first HPF section for applying, on a per spectrum basis, high-pass filtering to the first amplitude spectrum signal generated by the FFT section based on a preset first cut-off frequency; a first limiter section for limiting a negative side amplitude of the amplitude spectrum signal that has been subjected to the high-pass filtering by the first HPF section to set the negative side amplitude to 0 to detect, on a per spectrum basis, the attack component of the amplitude spectrum signal; and a first gain section for applying, based on a preset first weighting amount, weighting processing to the attack component of the amplitude spectrum signal detected by the first limiter section. The reverberation component controller includes: a second HPF section for applying, on a per spectrum basis, high-pass filtering to the first amplitude spectrum signal generated by the FFT section based on a preset second cut-off frequency; an amplitude inverting section for multiplying the amplitude spectrum signal that has been subjected to the high-pass filtering by the second HPF section by −1 to invert an amplitude of the amplitude spectrum signal; a second limiter section for limiting a negative side amplitude of the amplitude spectrum signal that has been subjected to the amplitude inversion by the amplitude inverting section to set the negative side amplitude to 0 to detect, on a per spectrum basis, the reverberation component of the amplitude spectrum signal; and a second gain section for applying, based on a preset second weighting amount, weighting processing to the reverberation component of the amplitude spectrum signal detected by the second limiter section.

An acoustic signal processing method according to the present invention is the method for an acoustic signal processing device in which an attack component control and a reverberation component control are applied to an input audio signal. The acoustic signal processing device includes: an FFT section for transforming the input audio signal from a time-domain signal into a frequency-domain signal to calculate a frequency spectrum signal and for generating a first amplitude spectrum signal and a phase spectrum signal; an attack component controller for controlling an attack component of the first amplitude spectrum signal generated by the FFT section to generate a second amplitude spectrum signal; a reverberation component controller for controlling a reverberation component of the first amplitude spectrum signal generated by the FFT section to generate a third amplitude spectrum signal; a first adding section for synthesizing the first amplitude spectrum signal generated by the FFT section, the second amplitude spectrum signal generated by the attack component controller, and the third amplitude spectrum signal generated by the reverberation component controller to generate a fourth amplitude spectrum signal; and an IFFT section for generating an audio signal transformed from a frequency domain to a time domain based on the fourth amplitude spectrum signal generated by the first adding section and the phase spectrum signal generated by the FFT section. The attack component controller includes a first HPF section, a first limiter section, and a first gain section. The reverberation component controller includes a second HPF section, an amplitude inverting section, a second limiter section, and a second gain section. The acoustic signal processing method includes the steps of: performing a short-time Fourier transform to the input audio signal with time shifted by a differential time between a Fourier transform length and an overlap length to calculate a plurality of amplitude spectra differing in time from one another by the differential time, calculating, on a per frequency basis, a time variation of each of the calculated amplitude spectrum to calculate the frequency spectrum signal, and generating the first amplitude spectrum signal and the phase spectrum signal based on the frequency spectrum signal, in the FFT section; applying, on a per spectrum basis, high-pass filtering to the first amplitude spectrum signal generated by the FFT section based on a preset first cut-off frequency by means of the first HPF section of the attack component controller; limiting a negative side amplitude of the amplitude spectrum signal that has been subjected to the high-pass filtering by the first HPF section to set the negative side amplitude to 0 to detect, on a per spectrum basis, the attack component of the amplitude spectrum signal by means of the first limiter section of the attack component controller; applying, based on a preset first weighting amount, weighting processing to the attack component of the amplitude spectrum signal detected by the first limiter section by means of the first gain section of the attack component controller; applying, on a per spectrum basis, high-pass filtering to the first amplitude spectrum signal generated by the FFT section based on a preset second cut-off frequency by means of the second HPF section of the reverberation component controller; multiplying the amplitude spectrum signal that has been subjected to the high-pass filtering by the second HPF section by −1 to invert an amplitude of the amplitude spectrum signal by means of the amplitude inverting section of the reverberation component controller; limiting a negative side amplitude of the amplitude spectrum signal that has been subjected to the amplitude inversion by the amplitude inverting section to set the negative side amplitude to 0 to detect, on a per spectrum basis, the reverberation component of the amplitude spectrum signal by means of the second limiter section of the reverberation component controller; applying, based on a preset second weighting amount, a weighting processing to the reverberation component of the amplitude spectrum signal detected by the second limiter section by means of the second gain section of the reverberation component controller; synthesizing the first amplitude spectrum signal, the second amplitude spectrum signal whose attack component has been subjected to the weighting processing by the first gain section, and the third amplitude spectrum signal whose reverberation component has been subjected to the weighting processing by the second gain section to generate a fourth amplitude spectrum signal by means of the first adding section; and calculating a frequency spectrum signal based on the fourth amplitude spectrum signal and the phase spectrum signal generated by the FFT section and applying an inverse short-time Fourier transform and an overlap addition to the calculated frequency spectrum signal to generate the audio signal transformed from a frequency domain to a time domain by means of the IFFT section.

In the acoustic signal processing device and acoustic signal processing method according to the present invention, by adjusting the first weighting amount of the first gain section of the attack component controller, it is possible to enhance/reduce the attack component (sound) of the audio signal. Further, by adjusting the first cut-off frequency of the first HPF section, it is possible to change the control time (enhancement time, reduction time) of the attack component. Thus, by amplifying the attack component in accordance with a signal level to enhance it, it is possible to make an output sound sharp as a whole. Further, by controlling the attack component which may be deteriorated in a common digital audio signal such as MP3, sound quality of the digital audio signal can be improved.

Further, in the acoustic signal processing device and acoustic signal processing method according to the present invention, by adjusting the second weighting amount of the second gain section of the reverberation component controller, it is possible to enhance/reduce the reverberation component (reverberation) of the audio signal. Further, by adjusting the second cut-off frequency of the second HPF section, it is possible to change the control time (enhancement time, reduction time) of the reverberation. Thus, it is possible to enhance or reduce the reverberation according to the listener's preferences.

Further, the above attack component control processing by the attack component controller, and reverberation component control processing by the reverberation component controller are performed based on a variation amount for each amplitude spectrum of the frequency domain. This solves a problem arising in the conventional method in which the threshold is used to identify the attack sound, that is, prevents a detection state from being significantly influenced by an amplitude level of the sound source.

Further, the cut-off frequencies (first cut-off frequency and second cut-off frequency) or weighting amounts (first weighting amount and second weighting amount) in the attack component controller and reverberation component controller can be set individually for each amplitude spectrum. Thus, a configuration may be possible, in which a frequency band is divided into a plurality of bands, and setting is made for each of the plurality of bands.

For example, a frequency region of an input audio signal is divided into a low-frequency region, a middle-frequency region, and a high-frequency region. In this case, by enhancing the attack component and reducing the reverberation in the low frequency region, power and responsive sound of a drum, etc., can be reproduced. Further, in the middle-frequency region, the reverberation component is enhanced to enhance resonance of the voice. Further, in the high-frequency region, the attack component is enhanced to make cymbal sound, etc., more clear.

The acoustic signal processing device described above may include a noise controller for performing noise control of the fourth amplitude spectrum signal generated by the first adding section to generate a fifth amplitude spectrum signal. The IFFT section may generate the audio signal transformed from a frequency domain to a time domain based on the fifth amplitude spectrum signal generated by the noise controller and the phase spectrum signal generated by the FFT section. The noise controller may include: a third HPF section for applying, on a per spectrum basis, high-pass filtering to the fourth amplitude spectrum signal generated by the first adding section based on a preset third cut-off frequency; a third limiter section for limiting a negative side amplitude of the amplitude spectrum signal that has been subjected to the high-pass filtering by the third HPF section to set the negative side amplitude to 0; a third gain section for applying, based on a preset third weighting amount which is a value equal to or more than 0 and equal to or less than 1, weighting processing to the amplitude spectrum signal whose negative side amplitude has been limited by the third limiter section; a fourth gain section for applying, based on a weighting amount obtained by subtracting a value of the third weighting amount from a value of 1, weighting processing to the fourth amplitude spectrum signal generated by the first adding section; and a second adding section for synthesizing the amplitude spectrum signal that has been subjected to the weighting processing by the third gain section and the amplitude spectrum signal that has been subjected to the weighting processing by the fourth gain section to generate the fifth amplitude spectrum signal.

In the acoustic signal processing method, the acoustic signal processing device described above may include a noise controller for performing noise control of the fourth amplitude spectrum signal generated by the first adding section to generate a fifth amplitude spectrum signal. The noise controller may include a third HPF section, a third limiter section, a third gain section, a fourth gain section, and a second adding section. The acoustic signal processing method described above may further include the steps of: generating the audio signal transformed from a frequency domain to a time domain based on the fifth amplitude spectrum signal generated by the noise controller and the phase spectrum signal generated by the FFT section, by means of the IFFT section; applying, on a per spectrum basis, high-pass filtering to the fourth amplitude spectrum signal generated by the first adding section based on a preset third cut-off frequency by means of the third HPF section of the noise controller; limiting a negative side amplitude of the amplitude spectrum signal that has been subjected to the high-pass filtering by the third HPF section to set the negative side amplitude to 0, by means of the third limiter section of the noise controller; applying, based on a preset third weighting amount which is a value equal to or more than 0 and equal to or less than 1, weighting processing to the amplitude spectrum signal whose negative side amplitude has been limited by the third limiter section by means of the third gain section of the noise controller; applying, based on a weighting amount obtained by subtracting a value of the third weighting amount from a value of 1, weighting processing to the fourth amplitude spectrum signal generated by the first adding section, by means of the fourth gain section of the noise controller; and synthesizing the amplitude spectrum signal that has been subjected to the weighting processing by the third gain section and the amplitude spectrum signal that has been subjected to the weighting processing by the fourth gain section to generate the fifth amplitude spectrum signal, by means of the second adding section of the noise controller.

Further, in the acoustic signal processing device and acoustic signal processing method according to the present invention, by adjusting the weighting amounts of the third gain section and fourth gain section of the noise controller, it is possible to adjust the noise reduction amount. Further, by adjusting the third cut-off frequency of the third HPF section, the DC component of the noise can be suppressed. Thus, it is possible to adjust stationary noise included in the recording environment of a sound source or the sound source itself.

Further, the above noise reduction processing is performed by the noise controller based on a variation amount for each amplitude spectrum of the frequency domain. This solves a problem arising in the conventional method in which the threshold is used to identify the attack sound, that is, prevents a detection state from being significantly influenced by an amplitude level of the sound source.

When an audio signal including a stationary signal component included in a sound source itself and/or a stationary noise component included in the recording environment of the sound source is reproduced, noise and the like may be perceived as a sound with a sense of presence as "listener is at the recording environment"; however, clearness of the musical instrumental sound or voice tends to be reduced. In this case, by using the acoustic signal processing device and acoustic signal processing method according to the present invention, the noise control can be performed in the noise controller to adjust the reduction amount of the noise, thereby allowing an acoustic component of the musical instrumental sound or voice to be output as a clear sound while maintaining the sense of presence to some extent.

Advantageous Effects of Invention

In the acoustic signal processing device and acoustic signal processing method according to the present invention, it is possible to adjust the attack component (attack sound) included in a sound source such as the musical instrumental sound, reverberation component (reverberation) that continues following the attack component, and a stationary noise component in the recording environment or a stationary signal component included in the sound source, thereby meeting listener's various preferences.

MODE FOR CARRYING OUT THE INVENTION

Figure 1:
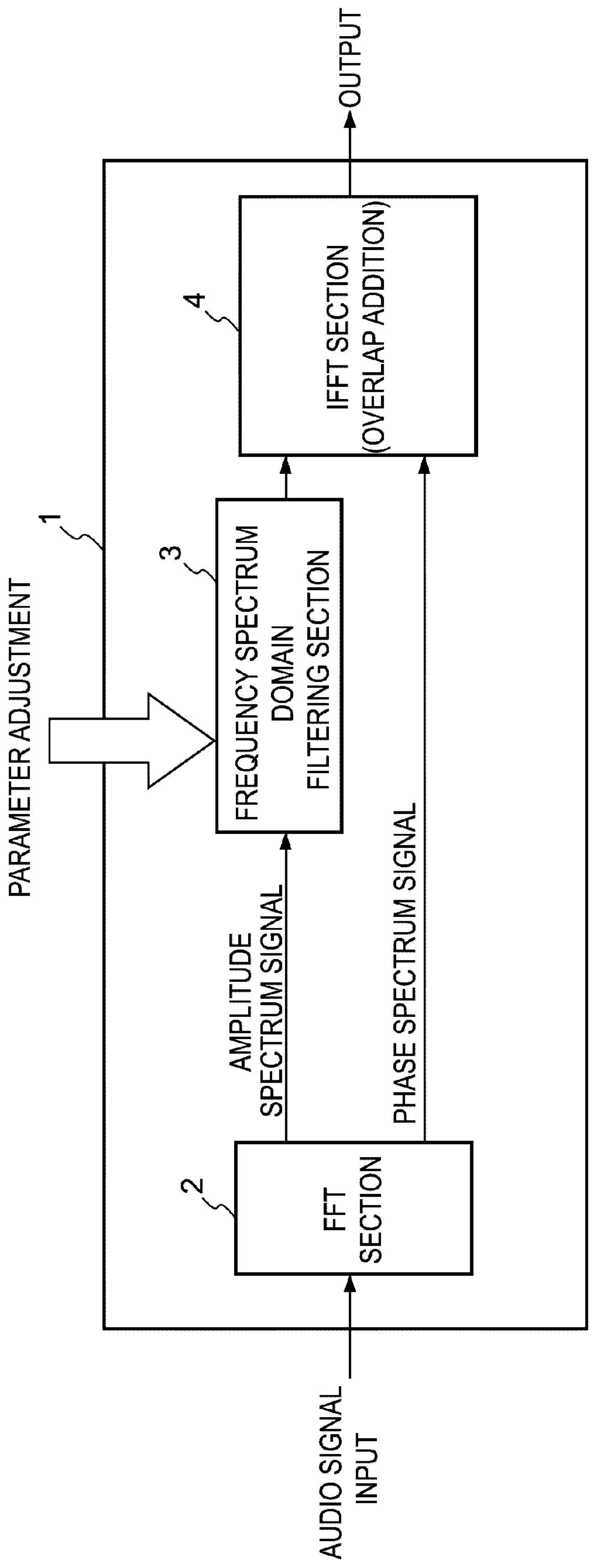
FIG. 1 is a block diagram illustrating a schematic configuration of an acoustic signal processing device according to an embodiment.

Hereinafter, detailed descriptions will be made by taking an example of an acoustic signal processing device according to the present invention. FIG. 1 is a block diagram illustrating a schematic configuration of the acoustic signal processing device. As illustrated in FIG. 1, an acoustic signal processing device 1 includes an FFT (Fast Fourier Transform) section 2, a frequency spectrum domain filtering section 3, and an IFFT (Inverse Fast Fourier Transform) section 4. An audio signal reproduced by a not illustrated audio signal reproduction device is input to the FFT section 2 of the acoustic signal processing device 1, and a signal that has been subjected to acoustic processing in the acoustic signal processing device 1 is output from the IFFT section 4 and then output from a not illustrated speaker.

[FFT Section]

The FFT section 2 weights the input audio signal through overlap processing and using a window function and performs a short-time Fourier transform to transform the input signal from a time-domain signal into a frequency-domain signal, to thereby calculate a frequency spectrum of real and imaginary parts. Further, the FFT section 2 transforms the calculated frequency spectra into an amplitude spectrum signal (first amplitude spectrum signal) and a phase spectrum signal. The FFT section 2 outputs the amplitude spectrum signal (first amplitude spectrum signal) to the frequency spectrum domain filtering section 3 and outputs the phase spectrum signal to the IFFT section 4.

Figure 2:
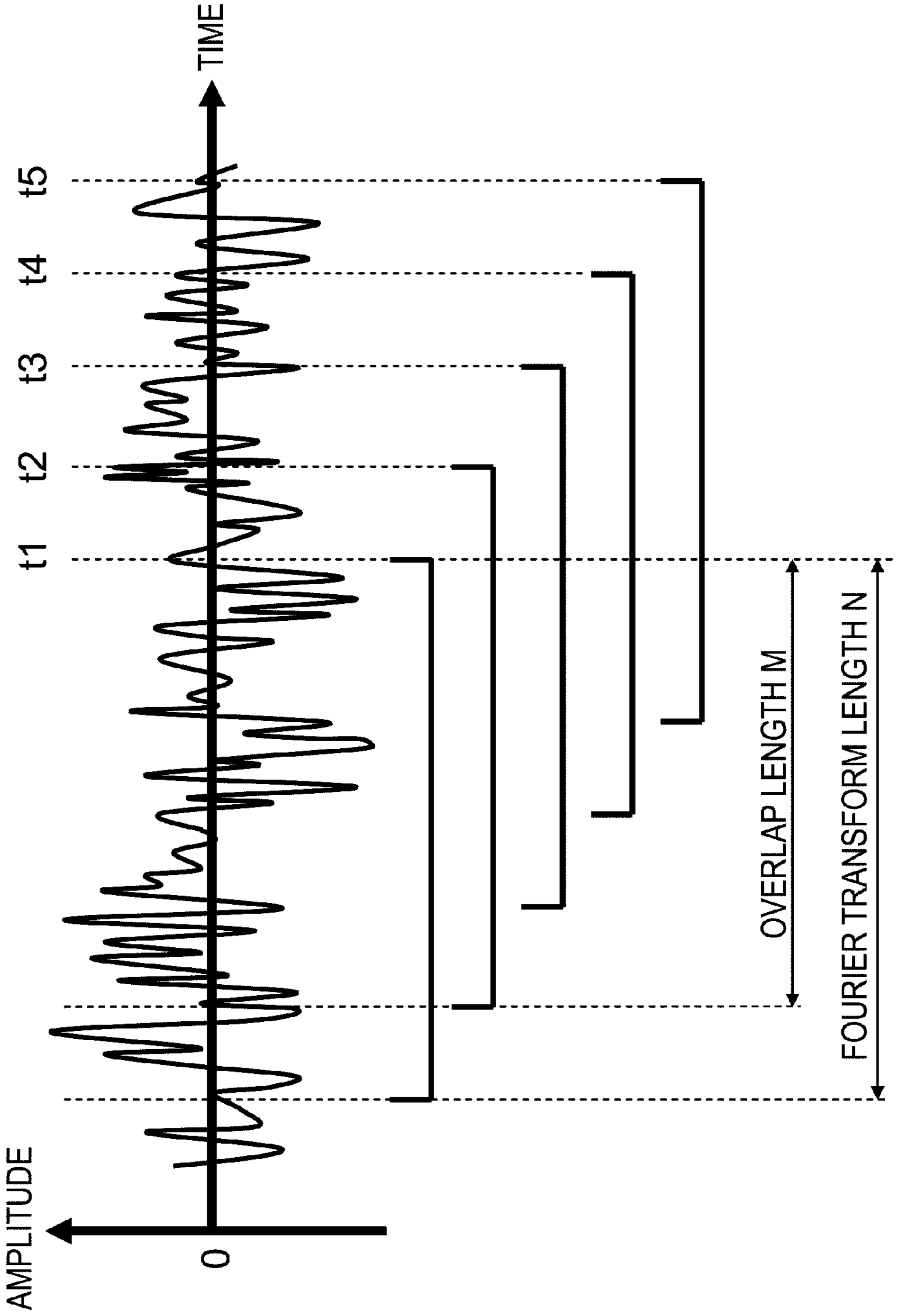
FIG. 2 is a view illustrating an audio signal input to an FFT section according to the embodiment and a Fourier transform length N and an overlap length M when short-time Fourier transform is applied to the input signal.

FIG. 2 is a view illustrating an input audio signal and a Fourier transform length N and an overlap length M when the short-time Fourier transform is applied to the input signal. As illustrated in FIG. 2, the FFT section 2 performs the short-time Fourier transform with time shifted by a differential time between the Fourier transform length N and overlap length M. More specifically, as illustrated in FIG. 2, to (n=1, 2, . . . , n) frequency spectra corresponding to time points (time t1, time t2, time t3, time t4, time t5, . . . ) obtained by shifting time by the differential time between the Fourier transform length N and overlap length M are calculated.

Figure 3:
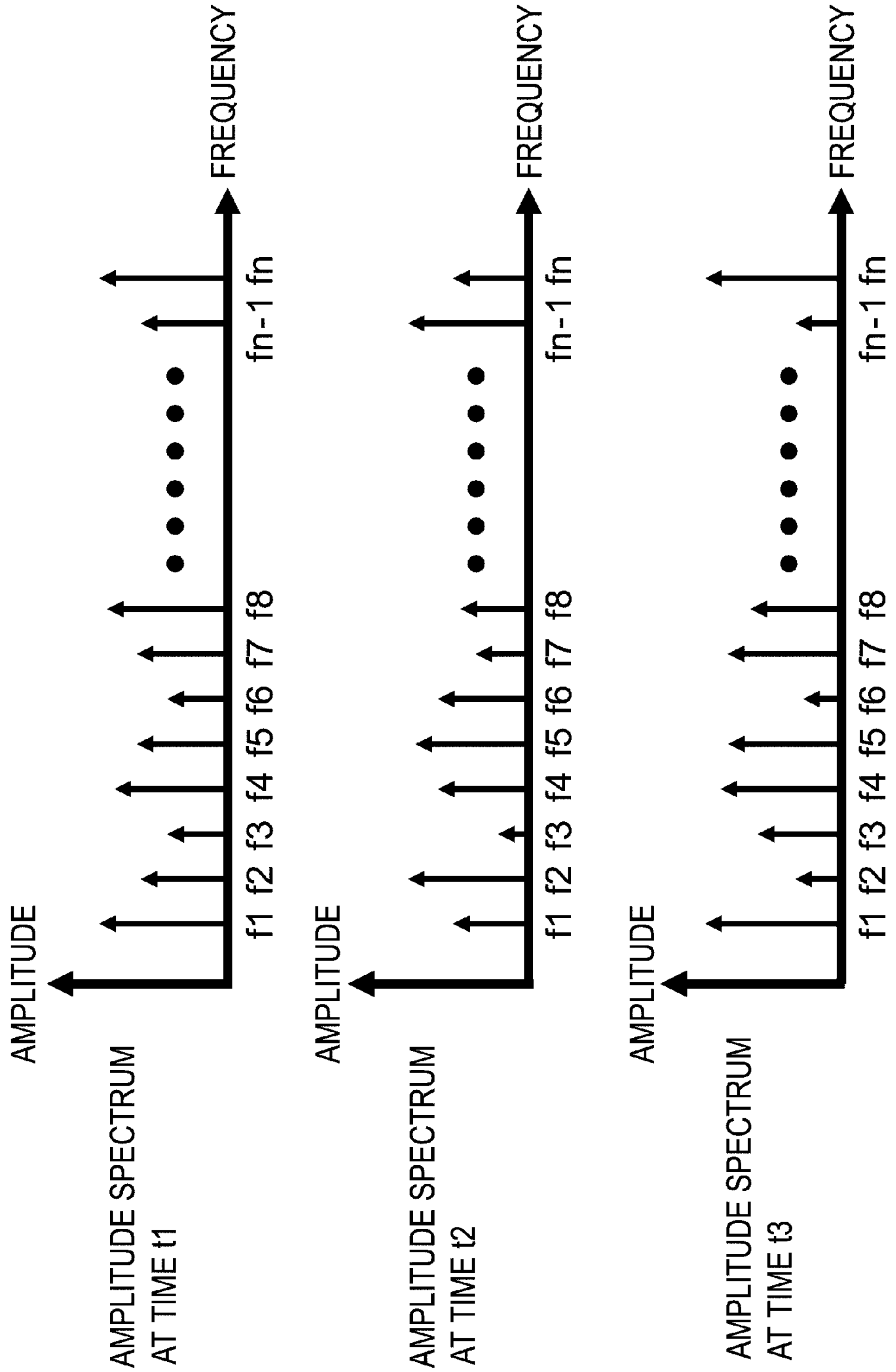
FIG. 3 is a view illustrating an amplitude spectrum for each time shift in the FFT section according to the embodiment.

FIG. 3 is a view illustrating an amplitude spectrum for each time shift. More specifically, FIG. 3 illustrates an amplitude spectrum at time t1, an amplitude spectrum at time t2, and an amplitude spectrum at time t3, in each of which amplitudes at respective frequencies (f1, f2, f3, f4, f5, f6, f7, f8, . . . , fn−1, fn) are shown. When a non-stationary signal such as music is input to the FFT section 2 as an audio signal, an amplitude spectrum varies for each time shift as illustrated in FIG. 3. In a case where the Fourier transform length is N, a total number of the frequency spectra is N.

Figure 4:
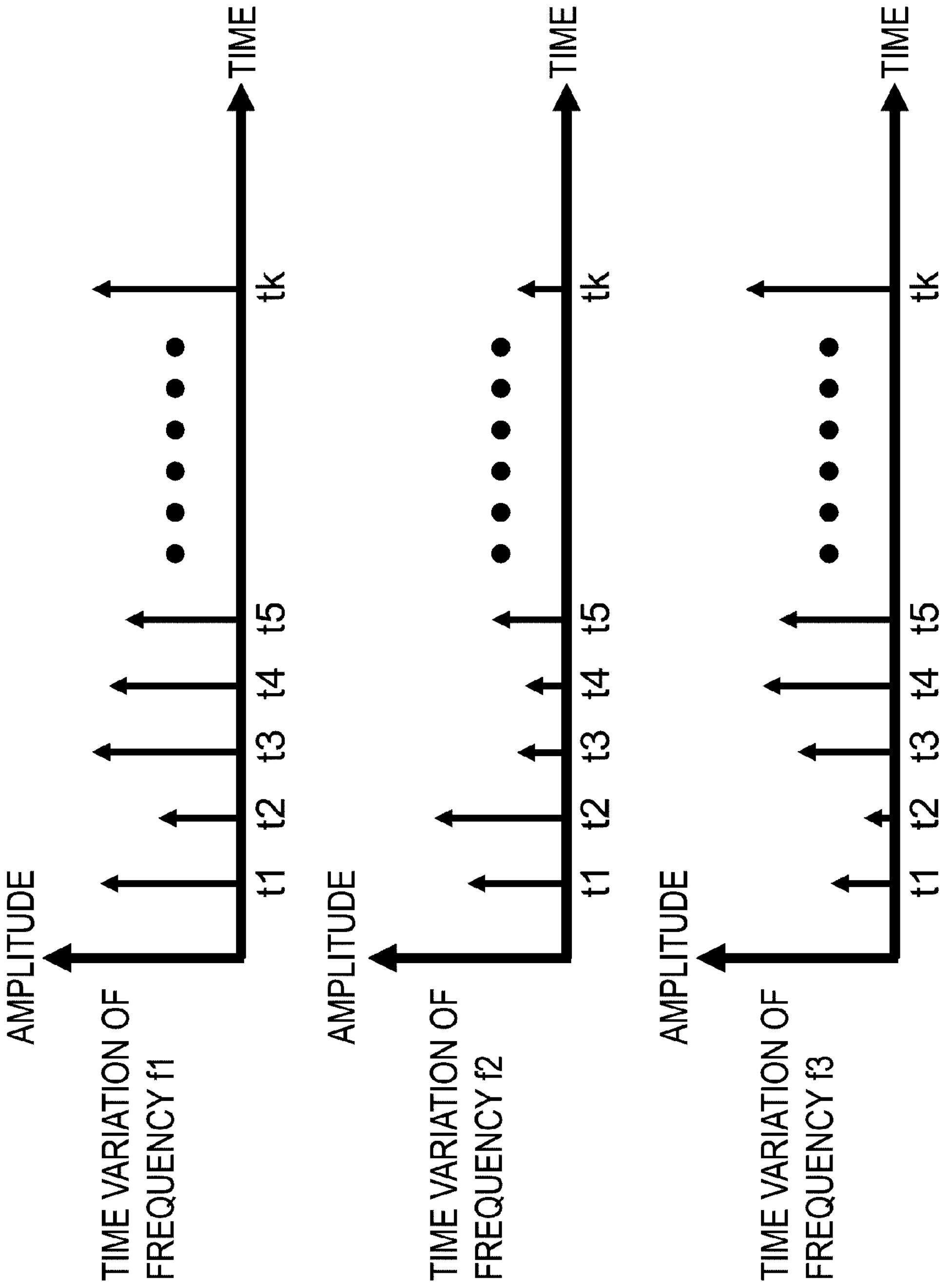
FIG. 4 is a view illustrating a time variation of the amplitude spectrum in the FFT section according to the embodiment.

FIG. 4 is a view illustrating a time variation of the amplitude spectrum. More specifically, FIG. 4 illustrates a time variation of an amplitude spectrum of the frequency f1, an amplitude spectrum of the frequency 12, an amplitude spectrum of the frequency f3, in each of which amplitudes at respective times (t1, t2, t3, t4, t5, . . . , tk) are shown. An interval of the time shift corresponds to a sampling frequency of the frequency spectrum.

[Frequency Spectrum Domain Filtering Section]

Figure 5:
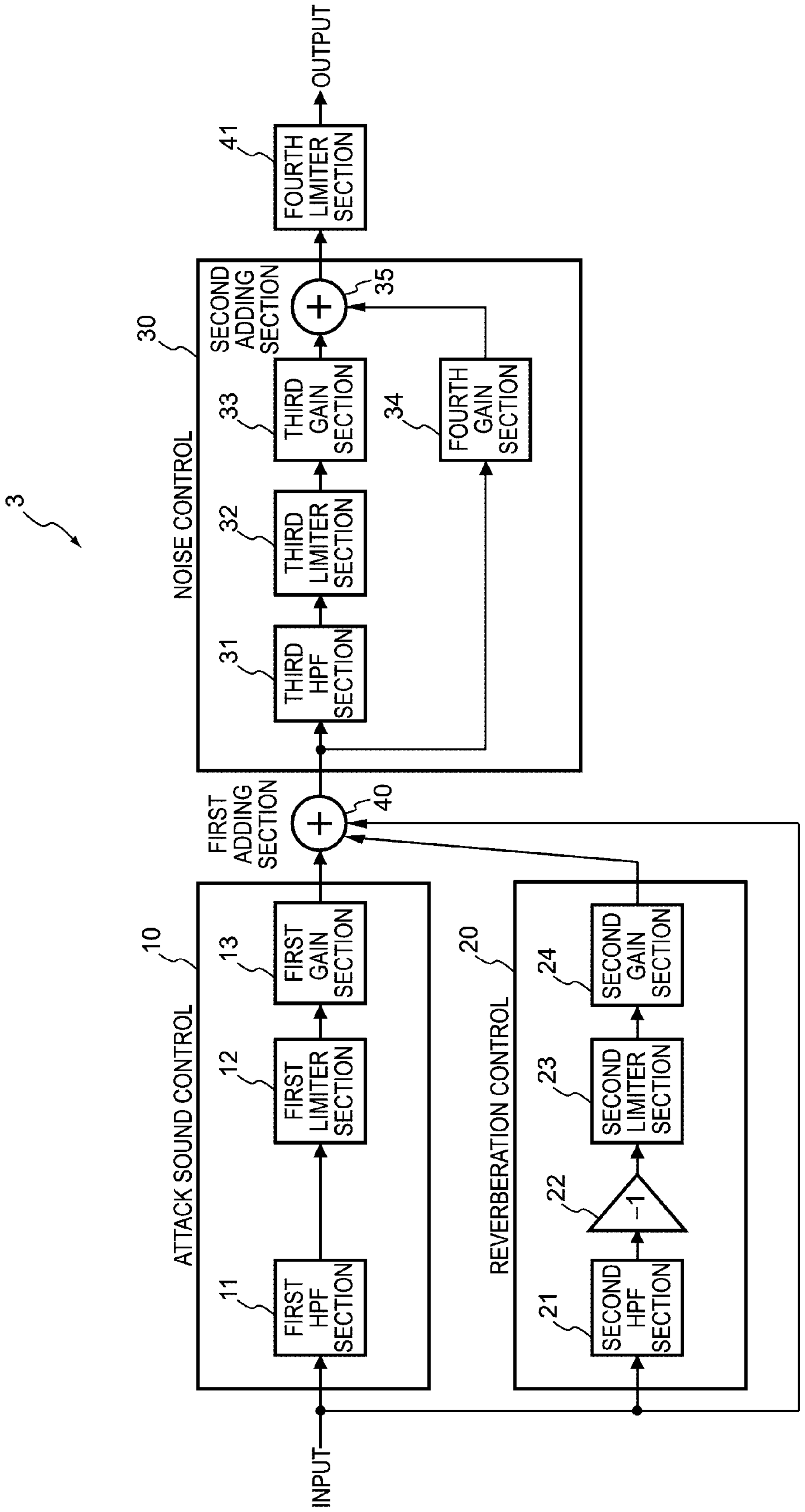
FIG. 5 is a block diagram illustrating a schematic configuration of a frequency spectrum domain filtering section according to the embodiment.

FIG. 5 is a block diagram illustrating a schematic configuration of the frequency spectrum domain filtering section 3. As illustrated in FIG. 5, the frequency spectrum domain filtering section 3 includes an attack sound controller (attack component controller) 10, a reverberation controller (reverberation component controller) 20, a noise controller 30, a first adding section 40, and a fourth limiter section 41.

A part of an amplitude spectrum signal (first amplitude spectrum signal) output from the FFT section 2 to the frequency spectrum domain filtering section 3 is input to the attack sound controller 10 and reverberation controller 20. The amplitude spectrum signals (second amplitude spectrum signal and third amplitude spectrum signal) that have been subjected to processing in the attack sound controller 10 and reverberation controller 20, respectively, are output to the first adding section 40. The remaining part of the amplitude spectrum signal (first amplitude spectrum signal) output from the FFT section 2 to the frequency spectrum domain filtering section 3 is directly input to the first adding section 40.

The frequency spectrum domain filtering section 3 applies, for each amplitude spectrum, filtering, amplitude limiting processing, and amplitude weighting processing to the audio signal (first amplitude spectrum signal) input thereto from the FFT section 2. A phase spectrum of the input audio signal is not subjected to any processing, as illustrated in FIG. 1.

[Attack Sound Controller]

The attack sound controller 10 includes a first HPF (High-pass filter) section 11, a first limiter section 12, and a first gain section 13.

The first HPF section 11 applies, for each spectrum, high-pass filtering, i.e., differential processing to the input amplitude spectrum signal (first amplitude spectrum signal). The first limiter section 12 limits a negative-side amplitude of the amplitude spectrum signal that has been subjected to the high-pass filtering to set it to 0. Setting the negative-side amplitude to 0 allows a rising component of the signal for each spectrum, i.e., an attack component (attack sound) to be detected.

The larger a value of a cut-off frequency (first cut-off frequency) to be set in the first HPF section 11, the shorter a control time of the attack sound; while the smaller the cut-off frequency value, the longer the control time. The cut-off frequency can be set as a parameter as illustrated in FIG. 1.

The first gain section 13 applies weighting (multiplication) to the attack component of the amplitude spectrum signal detected by the first limiter section 12. The signal (second amplitude spectrum signal) that has been subjected to the weighting by the first gain section 13 is output to the first adding section 40. In the addition section 40, the amplitude spectrum signal (second amplitude spectrum signal) whose attack component has been subjected to acoustic processing in the attack sound controller 10 is synthesized with the original amplitude spectrum signal (amplitude spectrum signal that has not been subjected to acoustic processing in the attack sound controller 10 and reverberation controller 20: first amplitude spectrum signal). When a weighting amount (first weighting amount) is a positive value as a result of the synthesis, the attack sound of the original amplitude spectrum signal (first amplitude spectrum signal) is enhanced, while when the weighting amount is a negative value, the attack sound thereof is reduced.

The larger the positive or negative value of the weighting amount, the higher a degree of enhancement or reduction of the attack sound becomes. The weighting amount (first weighting amount) can be set as a parameter as illustrated in FIG. 1. In the present embodiment, a value equal to or more than −1 and equal to or less than 1 is set, as described later.

[Reverberation Controller]

The reverberation controller 20 includes a second HPF section 21, an amplitude inverting section 22, a second limiter section 23, and a second gain section 24.

The second HPF section 21 applies, for each spectrum, high-pass filtering, i.e., differential processing to the input amplitude spectrum signal (first amplitude spectrum signal). The amplitude inverting section 22 multiplies the amplitude spectrum signal that has been subjected to the high-pass filtering in the second HPF section 21 by −1 to invert the amplitude.

The second limiter section 23 limits a negative-side amplitude of the amplitude spectrum signal whose amplitude has been inverted to set it to 0. Setting the negative-side amplitude to 0 allows a falling component of the signal for each spectrum, i.e., a reverberation component to be detected.

The larger a value of a cut-off frequency (second cut-off frequency) to be set in the second HPF section 21, the shorter a control time of the reverberation; while the smaller the cut-off frequency value, the longer the control time. The cut-off frequency can be set as a parameter as illustrated in FIG. 1.

The second gain section 24 applies weighting (multiplication) to the reverberation component of the amplitude spectrum signal detected by the second limiter section 23. The signal (third amplitude spectrum signal) that has been subjected to the weighting by the second gain section 24 is output to the first adding section 40. In the addition section 40, the amplitude spectrum signal (third amplitude spectrum signal) whose reverberation component has been subjected to acoustic processing in the reverberation controller 20 is synthesized with the original amplitude spectrum signal (amplitude spectrum signal that has not been subjected to acoustic processing in the attack sound controller 10 and reverberation controller 20: first amplitude spectrum signal). When a weighting amount (second weighting amount) is a positive value as a result of the synthesis, the reverberation of the original amplitude spectrum signal (first amplitude spectrum signal) is enhanced, while when the weighting amount is a negative value, the reverberation thereof is reduced.

The larger the positive or negative value of the weighting amount, the higher a degree of enhancement or reduction of the reverberation becomes. The weighting amount (second weighting amount) can be set as a parameter as illustrated in FIG. 1. In the present embodiment, a value equal to or more than −0.1 and equal to or less than 1 is set, as described later.

[First Adding Section]

The first adding section 40 has a role of synthesizing the amplitude spectrum signal (second amplitude spectrum signal) whose attack sound has been subjected to acoustic processing in the attack sound controller 10, amplitude spectrum signal (third amplitude spectrum signal) whose reverberation has been subjected to acoustic processing in the reverberation controller 20, and original amplitude spectrum signal (first amplitude spectrum signal) input thereto from the FFT section 2. The signal (fourth amplitude spectrum signal) synthesized in the first adding section 40 is enhanced or reduced in terms of the attack sound and reverberation as compared to the original amplitude spectrum signal (first amplitude spectrum signal) and output to the noise controller 30.

[Noise Controller]

The noise controller 30 has a role of improving an S/N ratio. The noise controller 30 includes a third HPF section 31, a third limiter section 32, a third gain section 33, a fourth gain section 34, and a second adding section 35. The amplitude spectrum signal (fourth amplitude spectrum signal) synthesized in the first adding section 40 is output to the third HPF section 31 and fourth gain section 34. The third HPF section 31 applies, for each spectrum, high-pass filtering, i.e., differential processing to the amplitude spectrum signal (fourth amplitude spectrum signal) synthesized (generated) in the first adding section 40. The third limiter section 32 limits a negative-side amplitude of the amplitude spectrum signal that has been subjected to the high-pass filtering to set it to 0.

The above operations of the third HPF section 31 and third limiter section 32 allow a signal component existing in a steady state, such as a CW (Constant Wave) to be determined as noise in the amplitude spectrum of the same frequency, and a stationary component, i.e., a DC (Direct Current) component can be suppressed by the differential processing. In general, the lower a cut-off frequency (third cut-off frequency) of a high-pass filter, the more a signal component near DC is suppressed, whereby a steadier signal can be suppressed.

As described later, in the third HPF section 31, a frequency lower than the cut-off frequencies (first cut-off frequency and second cut-off frequency) set in the first HPF section 11 and second HPF section 21 is set as a cut-off frequency (third cut-off frequency). The cut-off frequency can be set as a parameter as illustrated in FIG. 1.

The signal whose stationary component has been suppressed is subjected to weighting in the third gain section 33 and then output to the second adding section 35. On the other hand, the fourth gain section 34 is input with, separately from the amplitude spectrum signal to be input to the third HPF section 31, the amplitude spectrum signal (fourth amplitude spectrum signal) synthesized (generated) in the first adding section 40. The fourth gain section 34 applies weighting to the input amplitude spectrum signal and outputs the resultant signal to the second adding section 35.

The second adding section 35 synthesizes the amplitude spectrum signal that has been subjected to weighting in the third gain section 33 and amplitude spectrum signal that has been subjected to weighting in the fourth gain section 34. The signal synthesized in the second adding section 35 has been subjected to weighting in the third and fourth gain sections 33 and 34 and therefore becomes a signal (fifth amplitude spectrum signal) in which a noise reduction amount has been adjusted.

A weighting amount (third weighting amount) of the third gain section 33 and a weighting amount of the fourth gain section 34 can be set as parameters as illustrated in FIG. 1. In the present embodiment, a value equal to or more than 0 and equal to or less than 1 is set as the weighting amount (third weighting amount) of the third gain section 33, and a value obtained by subtracting the weighting amount (third weighting amount) of the third gain section 33 from a value of 1 is set as the weighting amount of the fourth gain section 34.

To significantly improve the S/N ratio, for example, the weighting amount of the third gain section 33 is set to 1, and weighting amount of the fourth gain section 34 is set to 0 (1−1=0). To slightly improve the S/N ratio, for example, the weighting amount of the third gain section 33 is set to 0.5, and weighting amount of the fourth gain section 34 is set to 0.5 (1−0.5=0.5).

[Fourth Limiter Section]

The fourth limiter section 41 has a role of performing adjustment such that an amplitude of the signal (fifth amplitude spectrum signal) that has been subjected to synthesis processing in the second adding section 35 does not become a negative value. More in detail, the fourth limiter section 41 performs adjustment such that an amplitude of a signal in which the attack sound, reverberation, and noise reduction amount have been adjusted by the attack sound controller 10, reverberation controller 20, and noise controller 30, respectively, does not become a negative value. The fourth limiter section 41 limits a negative-side amplitude of the signal to set it to 0.

Figure 6:
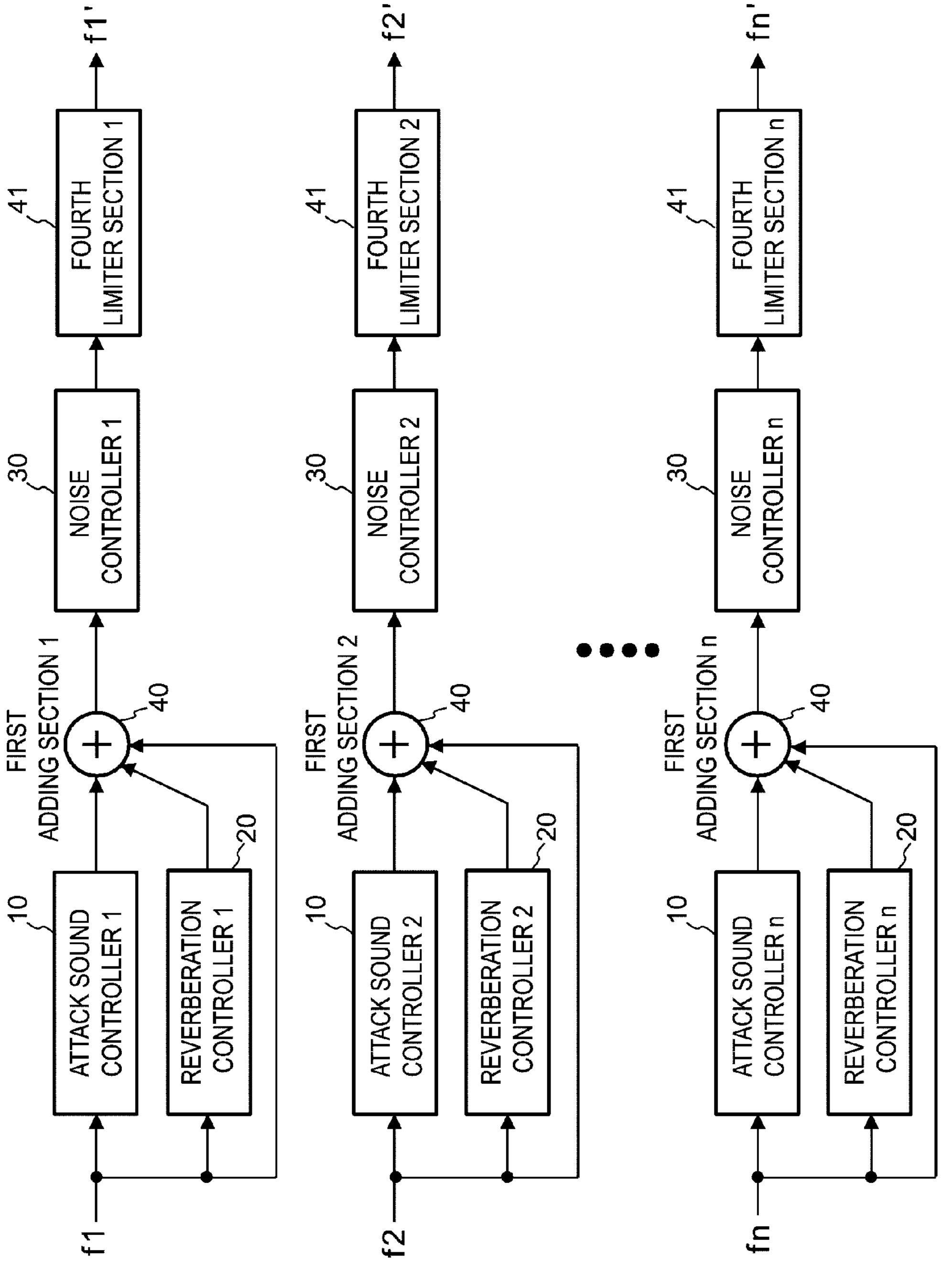
FIG. 6 is a view for explaining a state where processing of the acoustic signal processing device according to the embodiment is executed for each frequency.

The above acoustic processing of the attack sound controller 10, reverberation controller 20, first adding section 40, noise controller 30, and fourth limiter section 41 are performed for each amplitude spectrum. Therefore, as illustrated in FIG. 6, a frequency spectrum signal is adjusted for each frequency (f1, f2, . . . , fn) in terms of the attack sound, reverberation, noise reduction amount, and amplitude by the attack sound controller 10, reverberation controller 20, first adding section 40, noise controller 30, and fourth limiter section 41, respectively, and the resultant signal is output for each frequency (f1', f2', . . . , fn'). When the Fourier transform length N is 1,024, the number fn of frequencies is 1,024, which means that 1,024 frequency spectrum signals are processed.

The frequency spectrum signal whose amplitude has been adjusted in the fourth limiter section 41 is output to the IFFT section 4.

[IFFT Section]

The IFFT section 4 transforms the acquired signal into a frequency spectrum of real and imaginary parts based on the amplitude spectrum signal that has been filtering in the frequency spectrum domain filtering section 3 and phase spectrum signal output from the FFT section 2. After transforming the acquired signal into a frequency spectrum, the IFFT section 4 uses a window function to apply weighting to the frequency spectrum signal and then performs an inverse short-time Fourier transform and overlap addition to transform the resultant signal from a frequency-domain signal into a time-domain signal. The audio signal thus transformed from the frequency domain to time domain is output by a not illustrated speaker. The audio signal that has been subjected to the audio processing by the acoustic signal processing device 1 is output by the speaker as a signal in which the attack sound included in a sound source such as musical instrument sound and reverberation that continues following the attack sound has been controlled and further the S/N ratio has been improved.

[Adjustment of Setting Value]

Figure 7A:
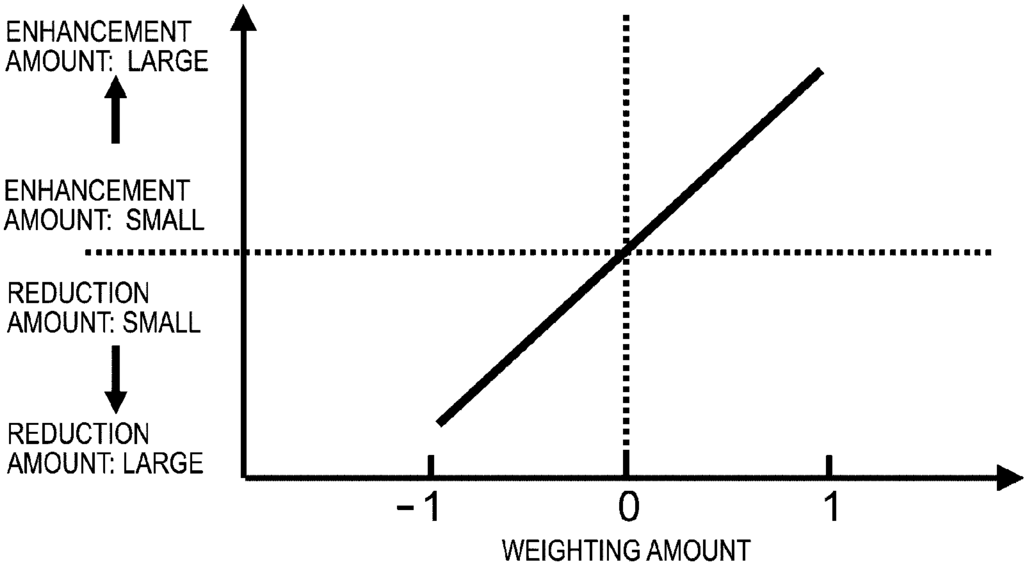
FIG. 7 (*a*) is a view illustrating a relationship between a weighting amount set in first gain section and a second gain section and an increase/reduction amount corresponding to the weighting amount, and FIG. 7 (*b*) is a view illustrating a relationship between a value of a cut-off frequency set in a first HPF section and a second HPF section and a control time of the attack sound or reverberation varying in accordance with the set cut-off frequency value.
Figure 7B:
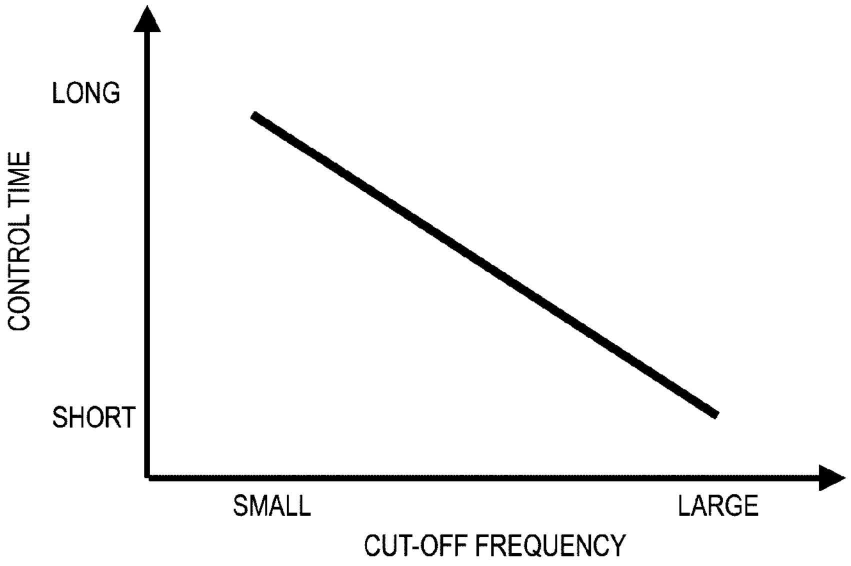

FIG. 7 (*a*) is a view illustrating a relationship between the weighting amount (first weighting amount and second weighting amount) set in the first gain section 13 of the attack sound controller 10 and second gain section 24 of the reverberation controller 20 and an enhancement/reduction amount corresponding to the weighting amount. As illustrated in FIG. 7 (*a*), the weighting amount set in the first gain section 13 and second gain section 24 is any value between −1 and 1. As illustrated in FIG. 7 (*a*), when the weighting amount is positive (setting value of the weighting amount is larger than 0), the attack sound is enhanced in the first gain section 13 in proportion to an increase in the value of the weighting amount, and the reverberation is enhanced in the second gain section 24 in proportion to an increase in the value of the weighting amount. On the other hand, as illustrated in FIG. 7 (*a*), when the weighting amount is negative (setting value of the weighting amount is smaller than 0), the attack sound is reduced in the first gain section 13 in proportion to a reduction in the value of the weighting amount, and the reverberation is reduced in the second gain section 24 in proportion to a reduction in the value of the weighting amount.

FIG. 7 (*b*) is a view illustrating a relationship between a value of the cut-off frequency (filter cut-off frequency: first cut-off frequency) set in the first HPF section 11 of the attack sound controller 10 and second HPF section 21 of the reverberation controller 20 and control time of the attack sound or reverberation varying in accordance with the set cut-off frequency value.

As illustrated in FIG. 7 (*b*), the larger a value of the cut-off frequency, the shorter the control time of the attack sound and control time of the reverberation; while the smaller the cut-off frequency value, the longer the control time thereof. That is, the larger the cut-off frequency value, the shorter a time during which the attack sound/reverberation is enhanced or reduced; while the smaller the cut-off frequency value, the longer the time during which the attack sound/reverberation is enhanced or reduced. Note that the inverse of the cut-off frequency substantially corresponds to the control time. In the present embodiment, the cut-off frequency is set in a range of 0.5 Hz to 10 Hz (control time: 2 sec to 0.1 sec).

Figure 8A:
FIG. 8 (*a*) is a view illustrating a relationship between a weighting amount and a noise reduction amount in a third gain section of a noise controller, and FIG. 8 (*b*) is a view illustrating an example of a state of an input audio signal used in acoustic signal processing.
Figure 8B:
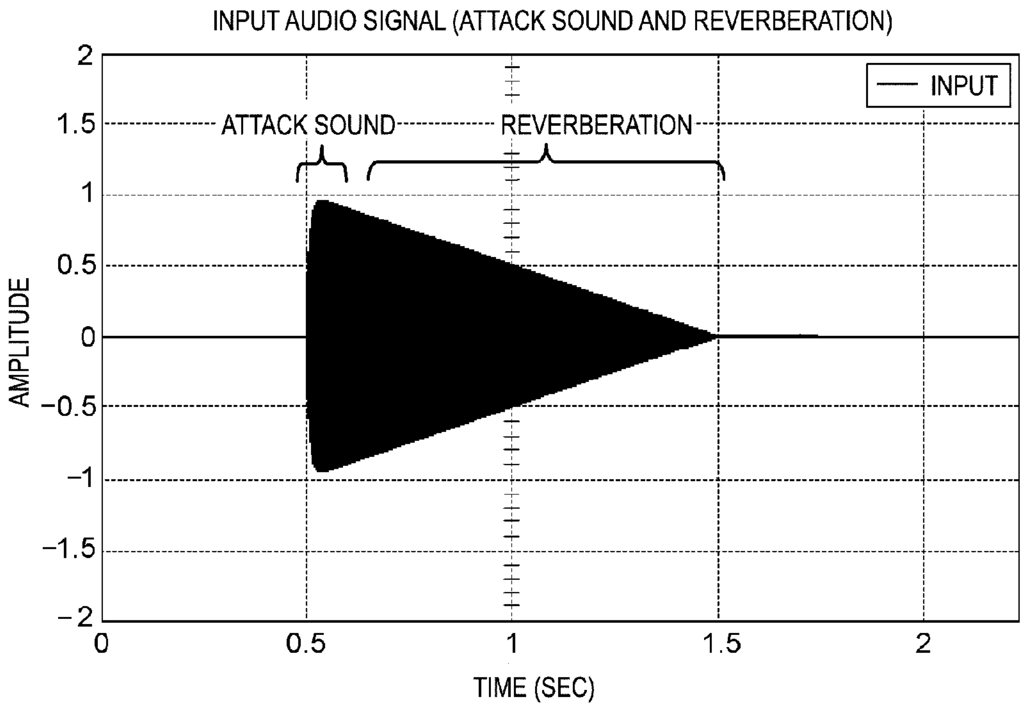

FIG. 8 (*a*) is a view illustrating a relationship between the weighting amount (third weighting amount) and noise reduction amount in the third gain section 33 of the noise controller 30. As described above, the third HPF section 31 of the noise controller 30 suppresses the stationary component, i.e., the DC component, so that a very small value (e.g., 0.031 Hz (control time: 32 sec)) is set as the cut-off frequency (filter cut-off frequency: third cut-off frequency).

The noise reduction amount of noise reduced in the noise controller 30 varies in accordance with a value of the weighting amount set in the third gain section 33. The value of the weighting amount to be set in the third gain section 33 is equal to or more than 0 and equal to or less than 1, and the noise reduction amount is increased as the weighting amount value varies from 0 to 1. The weighting amount value in the fourth gain section 34 is set to a value obtained by subtracting the weighting amount (value equal to or more than 0 and equal to or less than 1) set in the third gain section 33 from a value of 1.

As described above, by adjusting the value of the weighting amount (first weighting amount, second weighting amount) set in the first gain section 13 and second gain section 24, it is possible to enhance or reduce the attack sound and reverberation. Further, by adjusting the value of the cut-off frequency (first cut-off frequency, second cut-off frequency) set in the first HPF section 11 and second HPF section 21, it is possible to control a length of the control time of the attack sound and reverberation. Further, by adjusting the value of the weighting amount (third weighting amount, etc.) set in the third gain section 33 and fourth gain section 34, it is possible to control the noise reduction amount. As described above, the appropriate adjustment of the weighting amounts and cut-off frequencies allows adjustment of the attack sound included in a sound source such as musical instrument sound, reverberation that continues following the attack sound, and a stationary noise component in a recording environment or a stationary signal component included in the sound source, thereby allowing the audio signal to be adjusted to the listener's preferences.

[Acoustic Signal Processing Example]

The following describes an example of an output signal obtained when parameters, such as the weighting amount and cut-off frequency, of an audio signal as illustrated in FIG. 8 (*b*) input to the acoustic signal processing device 1 are adjusted in the frequency spectrum domain filtering section 3.

A sampling frequency of the input audio signal is assumed to be 44.1 kHz. Further, as illustrated in FIG. 8 (*b*), the input audio signal is composed of the attack sound and reverberation, and a frequency component thereof is 1 kHz.

A Fourier transform length N of the FFT section 2 is 4,096 sample, an overlap length M thereof is 3,840 sample which is 15/16 times the Fourier transform length N, a window function is a Blackman window function, and a sampling frequency of the amplitude spectrum is 172 Hz (44,100/(4,096−3,840)≈172).

Further, the first HPF section 11, second HPF section 21, and third HPF section 31 are each a linear Butterworth high-pass filter and have cut-off frequencies of 2.5 Hz, 1.25 Hz, and 0.031 Hz, respectively. Further, as the weighting amount, one of −1, 0, and 1 is set individually in each of the first gain section 13, second gain section 24, third gain section 33, and fourth gain section 34.

Figure 9A:
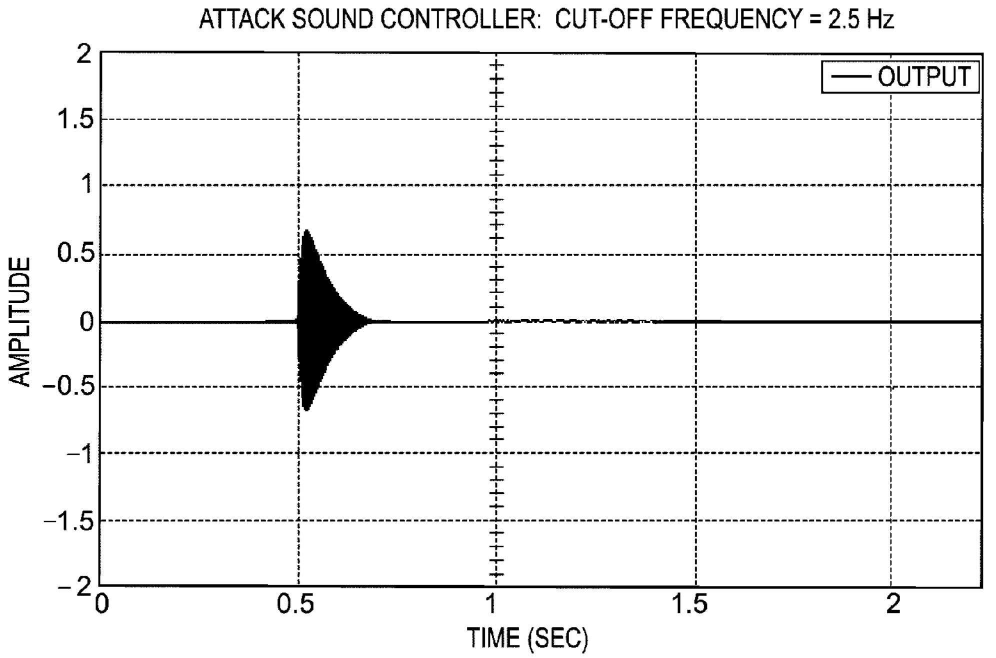
FIG. 9 (*a*) is a view illustrating an output signal obtained when only the first HPF section and first limiter section of the attack sound controller are operated, and FIG. 9 (*b*) is a view illustrating a signal obtained by synthesizing an audio signal obtained by operating the first HPF section and first limiter section to set the weighting value of the first gain section to 1 and an audio signal input to the frequency spectrum domain filtering section.
Figure 9B:
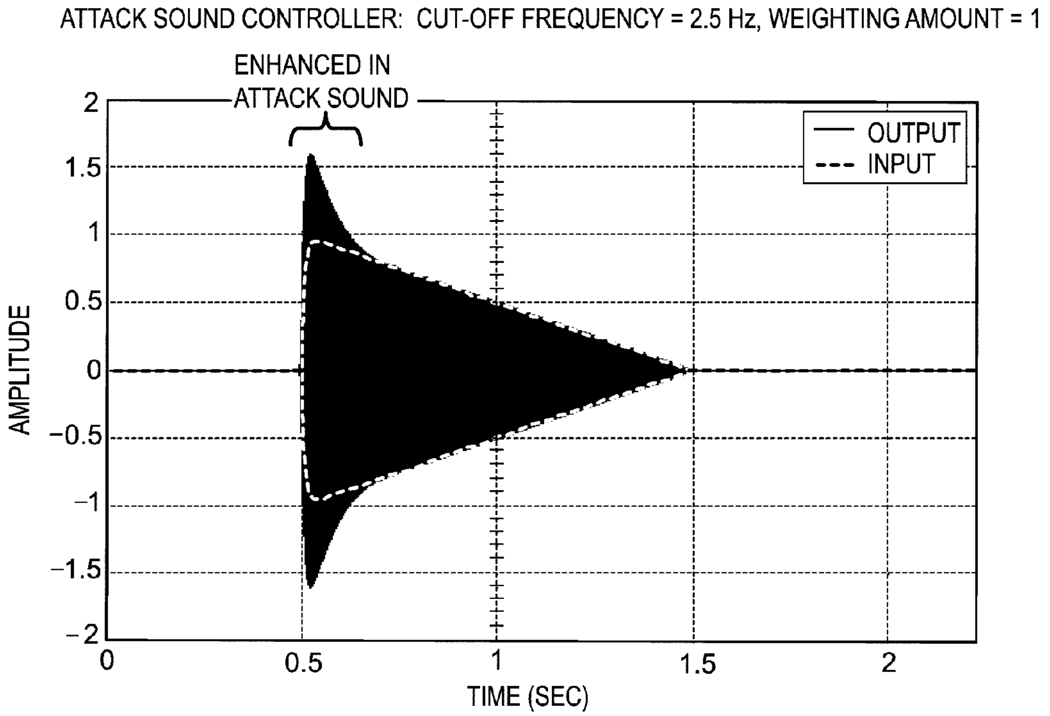

FIG. 9 (*a*) is a view illustrating an output signal obtained when only the first HPF section 11 and first limiter section 12 of the attack sound controller 10 are operated in the frequency spectrum domain filtering section 3. The cut-off frequency of the first HPF section 11 is 2.5 Hz.

When only the first HPF section 11 and first limiter section 12 of the attack sound controller 10 are operated, a rising component, i.e., the attack sound (attack component) of an input audio signal is detected as illustrated in FIG. 9 (*a*).

Further, a signal obtained by synthesizing an audio signal whose attack sound has been enhanced by operating the first HPF section 11 and first limiter section 12 of the attack sound controller 10 to set the weighting value of the first gain section 13 to 1 and an audio signal (signal illustrated in FIG. 8 (*b*)) input to the frequency spectrum domain filtering section 3 is denoted by a continuous line in FIG. 9 (*b*). A signal denoted by a dashed line in FIG. 9 (*b*) represents a state of the input audio signal illustrated in FIG. 8 (*b*). As denoted by the continuous line in FIG. 9 (*b*), the synthesized signal is enhanced in terms of the attack sound (attack component) as compared to the audio signal illustrated in FIG. 8 (*b*).

Figure 10A:
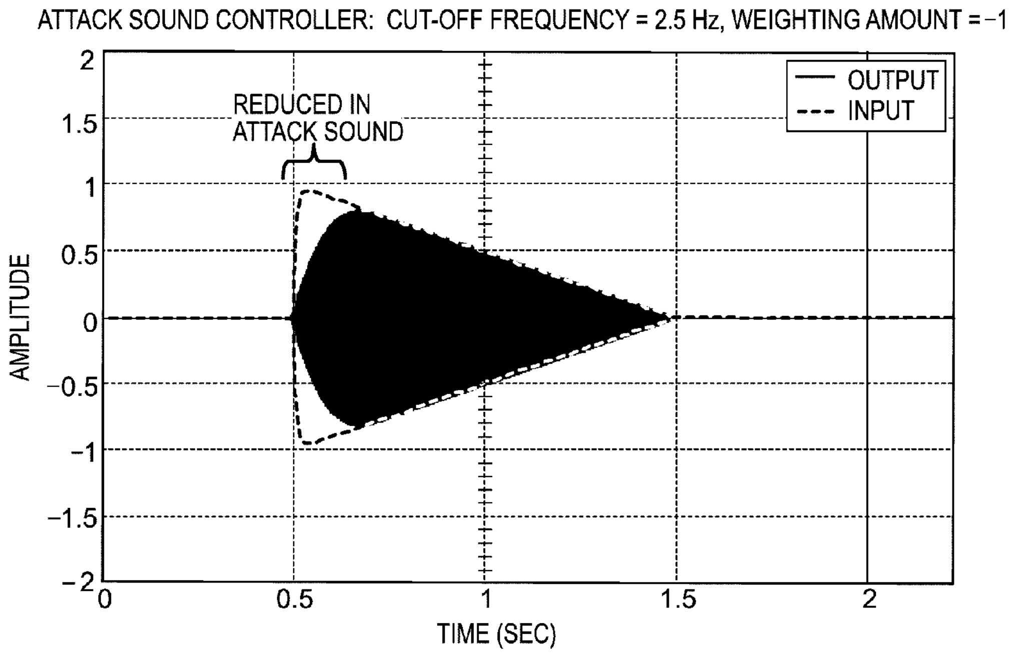
FIG. 10 (*a*) is a view illustrating a signal obtained by synthesizing an audio signal obtained by operating the first HPF section and first limiter section of the attack sound controller to set the weighting value of the first gain section to −1 and an audio signal input to the frequency spectrum domain filtering section, and FIG. 10 (*b*) is a view illustrating a signal synthesized when the cut-off frequency of the first HPF section is changed from 2.5 Hz to 1.25 Hz in the setting condition of the signal defined in FIG. 9 (*b*).
Figure 10B:
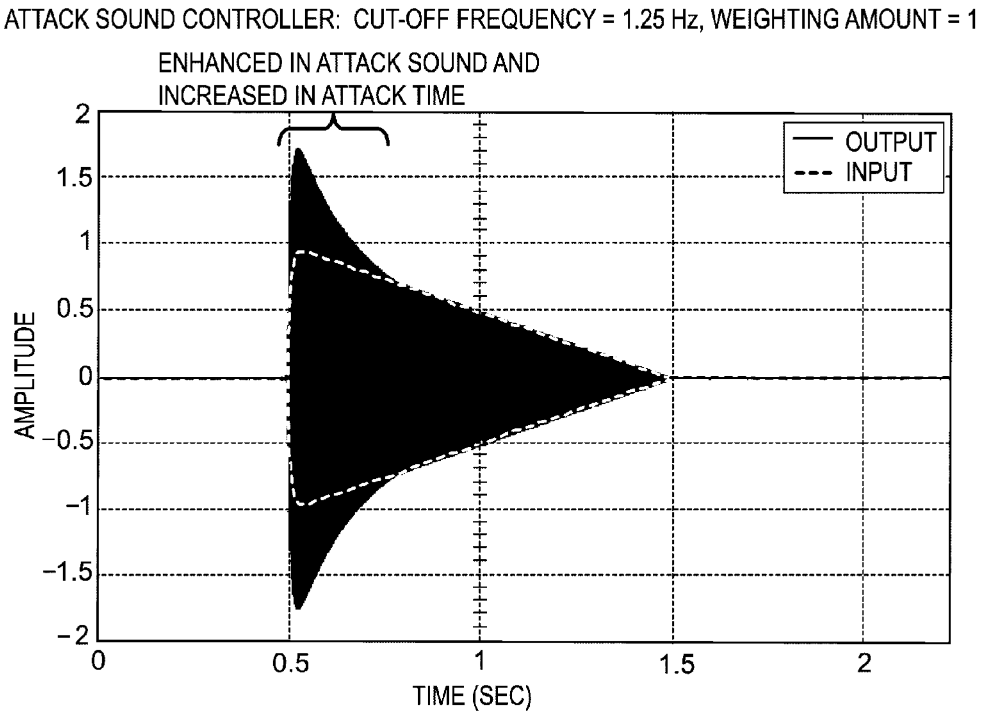

Further, a signal obtained by synthesizing an audio signal whose attack sound has been reduced by operating the first HPF section 11 and first limiter section 12 of the attack sound controller 10 to set the weighting value of the first gain section 13 to −1 and an audio signal (signal illustrated in FIG. 8 (*b*)) input to the frequency spectrum domain filtering section 3 is denoted by a continuous line in FIG. 10 (*a*). A signal denoted by a dashed line in FIG. 10 (*a*) represents a state of the input audio signal illustrated in FIG. 8 (*b*). As denoted by the continuous line in FIG. 10 (*a*), the synthesized signal is reduced in terms of the attack sound (attack component) as compared to the audio signal illustrated in FIG. 8 (*b*).

Further, a signal synthesized when the cut-off frequency of the first HPF section 11 is changed from 2.5 Hz to 1.25 Hz in the condition defined in FIG. 9 (*b*) is denoted by a continuous line in FIG. 10 (*b*). A signal denoted by a dashed line in FIG. 10 (*b*) represents a state of the input audio signal illustrated in FIG. 8 (*b*). The control time become longer by changing the cut-off frequency from 2.5 Hz to 1.25 Hz (see FIG. 7 (*b*)), so that the synthesized signal is not only enhanced in terms of the attack sound but also increased in terms of attack time as compared to the audio signal illustrated in FIG. 8 (*b*).

Figure 11A:
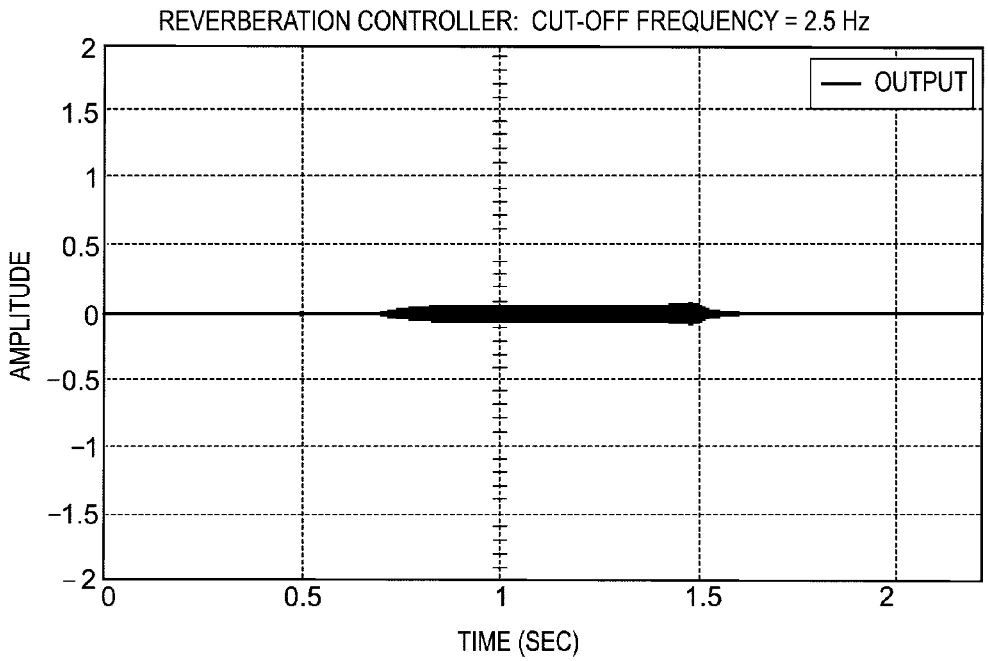
FIG. 11 (*a*) is a view illustrating an output signal obtained when only the second HPF section, amplitude inverting section, and second limiter section of the reverberation controller are operated, and FIG. 11 (*b*) is a view illustrating a signal obtained by synthesizing the signal illustrated in FIG. 9 (*b*), an audio signal obtained by operating the second HPF section, amplitude inverting section, and second limiter section to set the weighting value of the second gain section to −1 and an audio signal input to the frequency spectrum domain filtering section.
Figure 11B:
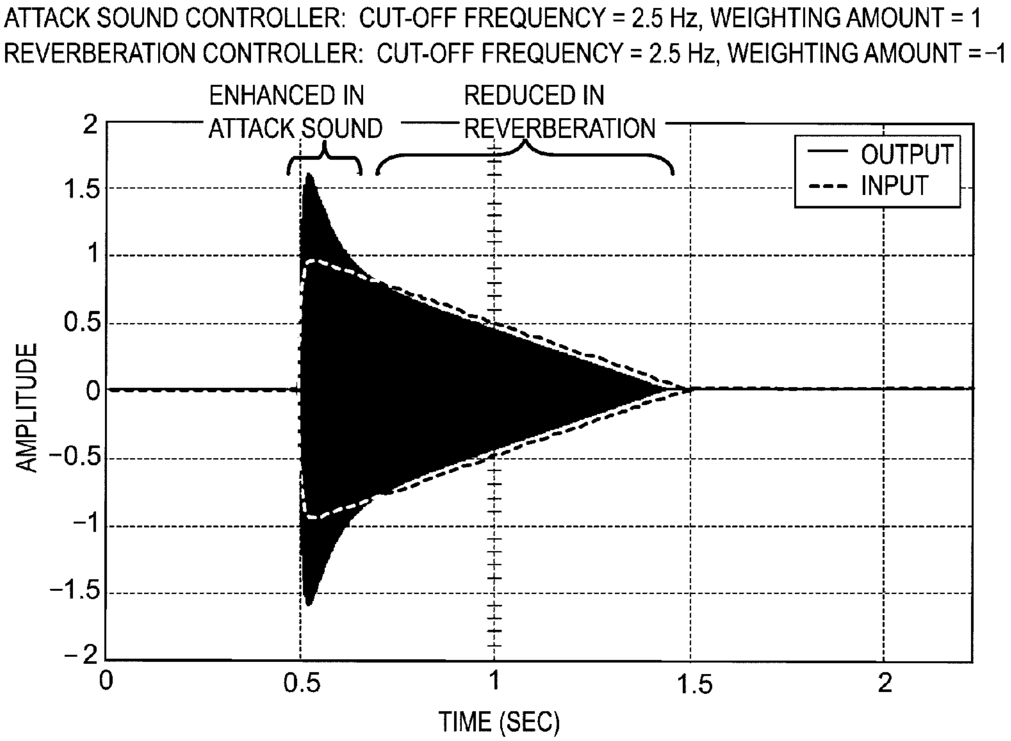

FIG. 11 (*a*) illustrates an output signal obtained when only the second HPF section 21, amplitude inverting section 22, and second limiter section 23 of the reverberation controller 20 are operated in the frequency spectrum domain filtering section 3. The cut-off frequency of the second HPF section 21 is 2.5 Hz.

When the second HPF section 21, amplitude inverting section 22, and second limiter section 23 of the reverberation controller 20 are operated, a falling component, i.e., the reverberation (reverberation component) of an input audio signal is detected as illustrated in FIG. 11 (*a*).

Further, a signal obtained by synthesizing the audio signal whose attack sound has been enhanced by the attack sound controller 10 as illustrated in FIG. 9 (*b*), an audio signal whose reverberation has been reduced by operating the second HPF section 21, amplitude inverting section 22, and second limiter section 23 of the reverberation controller 20 to set the weighting value of the second gain section 24 to −1, and the audio signal (signal illustrated in FIG. 8 (*b*)) input to the frequency spectrum domain filtering section 3 is denoted by a continuous line in FIG. 11 (*b*). A signal denoted by a dashed line in FIG. 11 (*b*) represents a state of the input audio signal illustrated in FIG. 8 (*b*). When the synthesized signal denoted by the continuous line in FIG. 11 (*b*) is compared to the input audio signal illustrated in FIG. 8 (*b*), the attack sound is enhanced while the reverberation is reduced. Further, as denoted by a continuous line in FIG. 11 (*b*), the synthesized signal is reduced in terms of the reverberation (reverberation component) as compared to the audio signal denoted by a continuous line in FIG. 9 (*b*).

Figure 12:
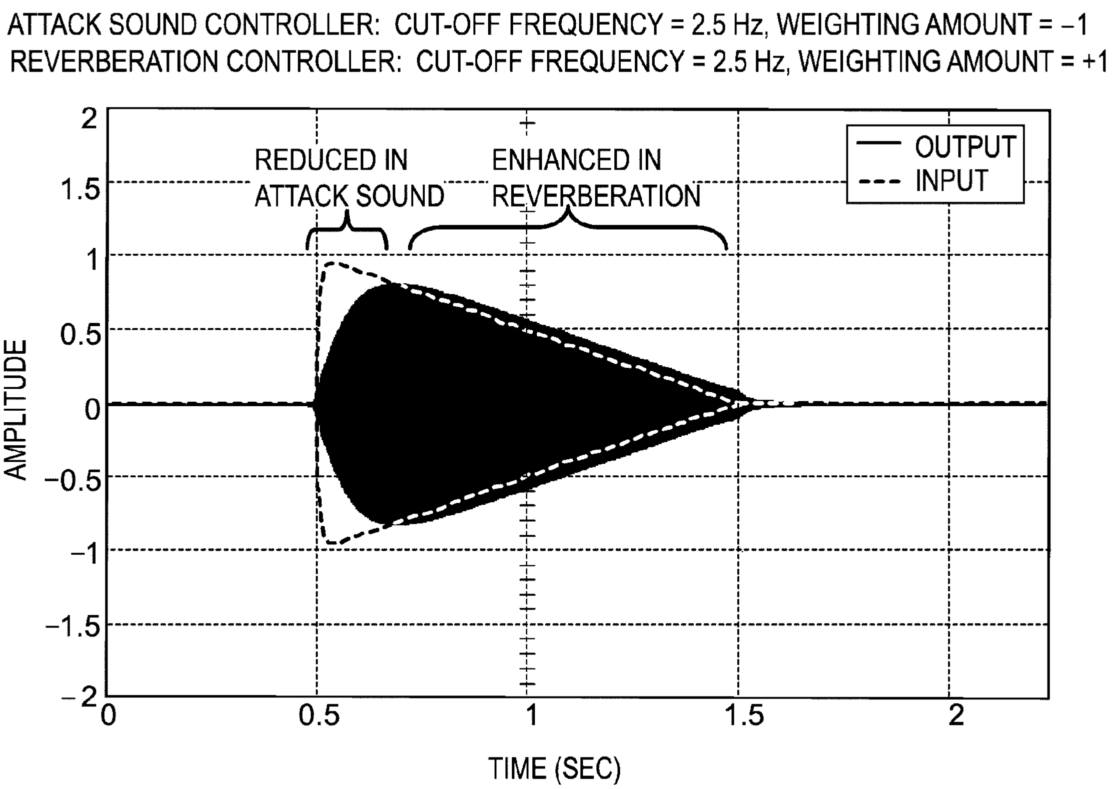
FIG. 12 is a view illustrating a signal obtained by synthesizing the signal illustrated in FIG. 10 (*a*) in which the attack sound has been reduced in the attack sound controller, an audio signal obtained by operating the second HPF section, amplitude inverting section, and second limiter section of the reverberation controller to set the weighting value of the second gain section to 1 and an audio signal input to the frequency spectrum domain filtering section.

Further, a signal obtained by synthesizing the audio signal whose attack sound has been reduced by the attack sound controller 10 as illustrated in FIG. 10 (*a*), an audio signal whose reverberation has been enhanced by operating the second HPF section 21, amplitude inverting section 22, and second limiter section 23 of the reverberation controller 20 to set the weighting value of the second gain section 24 to 1, and the audio signal (signal illustrated in FIG. 8 (*b*)) input to the frequency spectrum domain filtering section 3 is denoted by a continuous line in FIG. 12. A signal denoted by a dashed line in FIG. 12 represents a state of the input audio signal illustrated in FIG. 8 (*b*).

When the synthesized signal illustrated in FIG. 12 is compared to the input audio signal illustrated in FIG. 8 (*b*), the attack sound is reduced while the reverberation is enhanced. Further, as denoted by a continuous line in FIG. 12, the synthesized signal is enhanced in terms of the reverberation (reverberation component) as compared to the audio signal denoted by a continuous line in FIG. 10 (*a*).

Figure 13A:
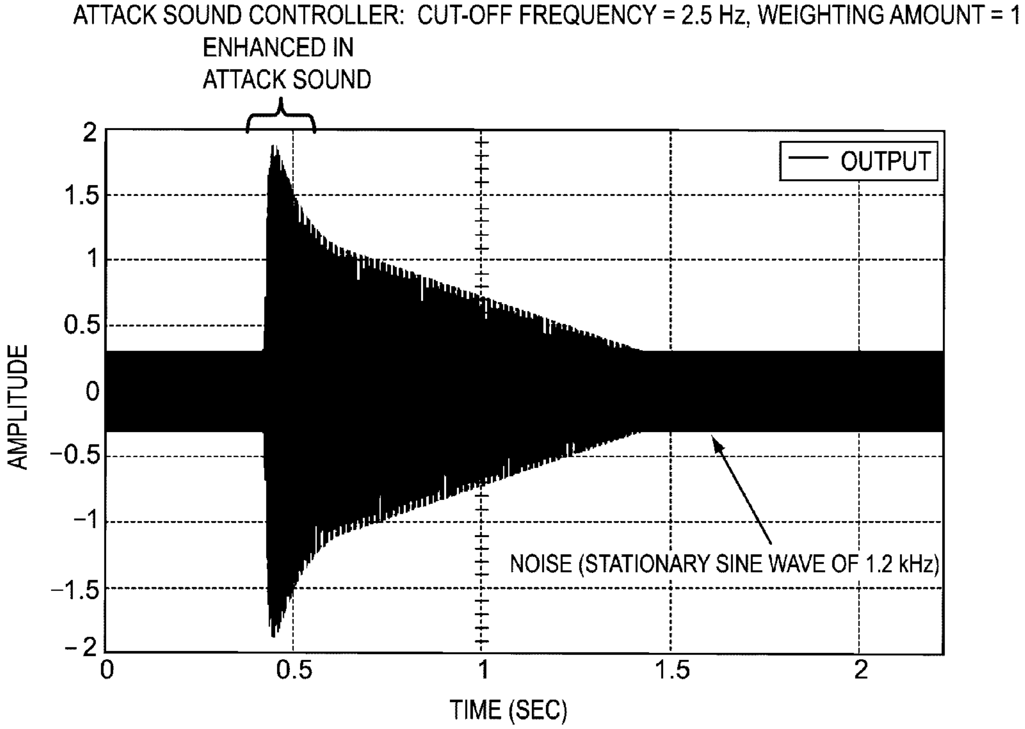
FIG. 13 (*a*) is a view illustrating an input signal obtained by adding, as noise, a stationary sine wave of 1.2 kHz to an input audio signal, and FIG. 13 (*b*) is a view illustrating a signal obtained by applying noise control processing to the signal illustrated in FIG. 13 (*a*) in the noise controller.
Figure 13B:
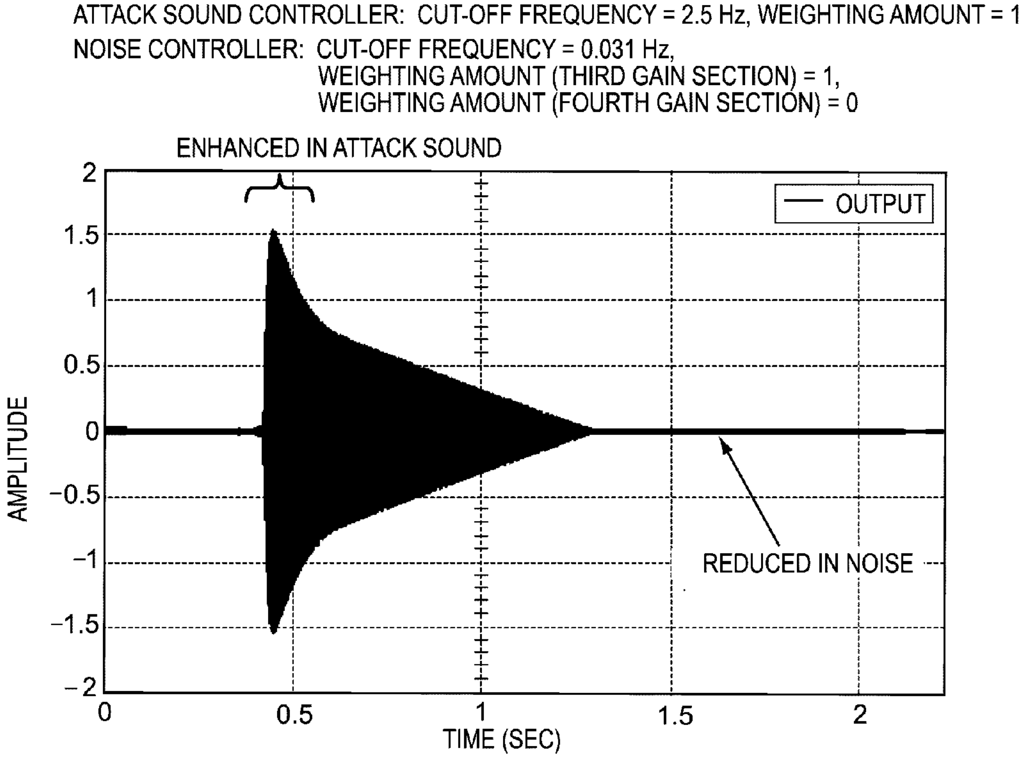

FIG. 13 (*a*) illustrates a state of an output signal obtained when the cut-off frequency of the first HPF section 11 of the attack sound controller 10 is set to 2.5 Hz and weighting amount of the first gain section 13 is set to 1 with respect to an input signal obtained by adding, as noise, a stationary sine wave of 1.2 kHz to the input audio signal (signal illustrated in FIG. 8 (*b*)). The attack sound control processing is applied, by the attack sound controller 10, to an audio signal added with the noise, so that the attack sound is enhanced in the signal illustrated in FIG. 13 (*a*).

FIG. 13 (*b*) illustrates a signal that has been subjected to noise control processing by the noise controller 30 obtained when the cut-off frequency of the third HPF section 31 of the noise controller 30 is set to 0.031 Hz, weighting amount of the third gain section 33 is set to 1, and weighting amount of the fourth gain section 34 is set to 0 with respect to the signal illustrated in FIG. 13 (*a*). As illustrated in FIG. 13 (*b*), by setting the cut-off frequency of the third HPF section 31 to a low value (0.031 Hz), a signal component near DC can be suppressed, so that it is possible to reduce only stationary noise while maintaining the enhanced attack sound.

As described above, in the acoustic signal processing device 1 according to the present embodiment, by adjusting the weighting amount of the first gain section 13 of the attack sound controller 10, it is possible to enhance/reduce the attack sound of the audio signal. Further, by adjusting the cut-off frequency of the first HPF section 11, it is possible to change the control time (enhancement time, reduction time) of the attack sound. Thus, by amplifying the attack sound in accordance with a signal level to enhance it, it is possible to make an output sound sharp as a whole. Further, by controlling the attack sound which may be deteriorated in a common digital audio signal such as MP3, sound quality of the digital audio signal can be improved.

Further, in the acoustic signal processing device 1 according to the present embodiment, by adjusting the weighting amount of the second gain section 24 of the reverberation controller 20, it is possible to enhance/reduce the reverberation of the audio signal. Further, by adjusting the cut-off frequency of the second HPF section 21, it is possible to change the control time (enhancement time, reduction time) of the reverberation. Thus, it is possible to enhance or reduce the reverberation according to the listener's preferences.

Further, in the acoustic signal processing device 1 according to the present embodiment, by adjusting the weighting amounts of the third gain section 33 and fourth gain section 34 of the noise controller 30, it is possible to adjust the noise reduction amount. Further, by adjusting the cut-off frequency of the third HPF section 31, the DC component of the noise can be suppressed. Thus, it is possible to adjust stationary noise included in the recording environment of a sound source or the sound source itself.

Further, the above attack sound control processing, reverberation control processing, and noise reduction processing are performed based on a variation amount for each amplitude spectrum of the frequency domain. This solves a problem arising in the conventional method in which the threshold is used to identify the attack sound, that is, prevents a detection state from being significantly influenced by an amplitude level of the sound source (the detection state does not depend on the amplitude level of the sound source).

For example, in an audio signal including the musical instrumental sound and voice, the voice is slower in its rising than the attack sound of the musical instrumental sound and smaller in variation for each amplitude spectrum, allowing the attack sound to be added only to the musical instrumental sound according to the setting of the cut-off frequency of the first HPF section 11 in the attack sound controller 10. By thus enhancing only the attack sound of the musical instrumental sound, it is possible to enhance sharpness of the musical instrumental sound while maintaining lively voice.

Further, the cut-off frequencies or weighting amounts in the attack sound controller 10, reverberation controller 20, and noise controller 30 can be set individually for each amplitude spectrum. Thus, a configuration may be possible, in which a frequency band is divided into a plurality of bands, and setting is made for each of the plurality of bands.

For example, a frequency region of an input audio signal is divided into a low-frequency region, a middle-frequency region, and a high-frequency region. In this case, by enhancing the attack sound and reducing the reverberation in the low frequency region, power and responsive sound of a drum, etc., can be reproduced. Further, in the middle-frequency region, the reverberation is enhanced to enhance resonance of the voice. Further, in the high-frequency region, the attack sound is enhanced to make cymbal sound, etc., more clear.

When an audio signal including a stationary signal component included in a sound source itself and/or a stationary noise component included in the recording environment of the sound source is reproduced, noise and the like may be perceived as a sound with a sense of presence as "listener is at the recording environment"; however, clearness of the musical instrumental sound or voice tends to be reduced. In this case, noise control is performed in the noise controller 30 to slightly reduce noise amount, thereby allowing an acoustic component of the musical instrumental sound or voice to be output as a clear sound while maintaining the sense of presence to some extent.

As described above, by using acoustic signal processing device 1 according to the present embodiment, it is possible to adjust the attack sound included in a sound source such as the musical instrumental sound, reverberation that continues following the attack sound, and a stationary noise component in the recording environment or a stationary signal component included in the sound source, thereby meeting listener's various preferences.

Although the acoustic signal processing device of the present invention has been described in detail and shown as an example of the acoustic signal processing device 1, the acoustic signal processing device and the acoustic signal processing method of the present inventions are not limited to the embodiments described above. It is apparent that a person skilled in the art can give thought to various alternative implementations and modified implementations within the scope of the claims.

REFERENCE SINGS LIST

1: acoustic signal processing device
2: FFT section
3: frequency spectrum domain filtering section
4: IFFT section
10: attack sound controller (attack component controller)
11: first HPF section (of attack sound controller)
12: first limiter section (of attack sound controller)
13: first gain section (of attack sound controller)
20: reverberation controller (reverberation component controller)
21: second HPF section (of reverberation controller)
22: amplitude inverting section (of reverberation controller)
23: second limiter section (of reverberation controller)
24: second gain section (of reverberation controller)
30: noise controller
31: third HPF section (of noise controller)
32: third limiter section (of noise controller)
33: third gain section (of noise controller)
34: fourth gain section (of noise controller)
35: second adding section (of noise controller)
40: first adding section
41: fourth limiter section

The invention claimed is:

1. An acoustic signal processing device comprising:

an FFT section in which a short-time Fourier transform to an input audio signal is performed with time shifted by a differential time between a Fourier transform length and an overlap length to transform the input audio signal from a time-domain signal into a frequency-domain signal and to calculate a frequency spectrum signal, and a first amplitude spectrum signal and a phase spectrum signal are generated based on the frequency spectrum signal;

an attack component controller provided for controlling an attack component of the first amplitude spectrum signal generated by the FFT section to generate a second amplitude spectrum signal;

a reverberation component controller provided for controlling a reverberation component of the first amplitude spectrum signal generated by the FFT section to generate a third amplitude spectrum signal;

a first adding section provided for synthesizing the first amplitude spectrum signal generated by the FFT section, the second amplitude spectrum signal generated by the attack component controller, and the third amplitude spectrum signal generated by the reverberation component controller to generate a fourth amplitude spectrum signal; and an IFFT section provided for calculating a frequency spectrum signal based on the fourth amplitude spectrum signal generated by the first adding section and the phase spectrum signal generated by the FFT section and applying an inverse short-time Fourier transform and an overlap addition to the calculated frequency spectrum signal to generate an audio signal transformed from a frequency domain to a time domain, wherein the attack component controller comprises:

a first HPF section for applying, on a per spectrum basis, high-pass filtering to the first amplitude spectrum signal generated by the FFT section based on a preset first cut-off frequency;

a first limiter section for limiting a negative side amplitude of the amplitude spectrum signal that has been subjected to the high-pass filtering by the first HPF section to set the negative side amplitude to 0 to detect, on a per spectrum basis, the attack component of the amplitude spectrum signal; and a first gain section for applying, based on a preset first weighting amount, weighting processing to the attack component of the amplitude spectrum signal detected by the first limiter section, the reverberation component controller comprises:

a second HPF section for applying, on a per spectrum basis, high-pass filtering to the first amplitude spectrum signal generated by the FFT section based on a preset second cut-off frequency;

an amplitude inverting section for multiplying the amplitude spectrum signal that has been subjected to the high-pass filtering by the second HPF section by −1 to invert an amplitude of the amplitude spectrum signal;

a second limiter section for limiting a negative side amplitude of the amplitude spectrum signal that has been subjected to the amplitude inversion by the amplitude inverting section to set the negative side amplitude to 0 to detect, on a per spectrum basis, the reverberation component of the amplitude spectrum signal; and a second gain section for applying, based on a preset second weighting amount, weighting processing to the reverberation component of the amplitude spectrum signal detected by the second limiter section.

2. The acoustic signal processing device according to claim 1, further comprising a noise controller for performing noise control of the fourth amplitude spectrum signal generated by the first adding section to generate a fifth amplitude spectrum signal, wherein the IFFT section generates the audio signal transformed from a frequency domain to a time domain based on the fifth amplitude spectrum signal generated by the noise controller and the phase spectrum signal generated by the FFT section, and the noise controller comprises:

a third HPF section for applying, on a per spectrum basis, high-pass filtering to the fourth amplitude spectrum signal generated by the first adding section based on a preset third cut-off frequency;

a third limiter section for limiting a negative side amplitude of the amplitude spectrum signal that has been subjected to the high-pass filtering by the third HPF section to set the negative side amplitude to 0;

a third gain section for applying, based on a preset third weighting amount which is a value equal to or more than 0 and equal to or less than 1, weighting processing to the amplitude spectrum signal whose negative side amplitude has been limited by the third limiter section;

a fourth gain section for applying, based on a weighting amount obtained by subtracting a value of the third weighting amount from a value of 1, weighting processing to the fourth amplitude spectrum signal generated by the first adding section; and a second adding section for synthesizing the amplitude spectrum signal that has been subjected to the weighting processing by the third gain section and the amplitude spectrum signal that has been subjected to the weighting processing by the fourth gain section to generate the fifth amplitude spectrum signal.

3. An acoustic signal processing method for an acoustic signal processing device in which an attack component control and a reverberation component control are applied to an input audio signal, the acoustic signal processing device comprising:

an FFT section for transforming the input audio signal from a time-domain signal into a frequency-domain signal to calculate a frequency spectrum signal and for generating a first amplitude spectrum signal and a phase spectrum signal;

an attack component controller for controlling an attack component of the first amplitude spectrum signal generated by the FFT section to generate a second amplitude spectrum signal;

a reverberation component controller for controlling a reverberation component of the first amplitude spectrum signal generated by the FFT section to generate a third amplitude spectrum signal;

a first adding section for synthesizing the first amplitude spectrum signal generated by the FFT section, the second amplitude spectrum signal generated by the attack component controller, and the third amplitude spectrum signal generated by the reverberation component controller to generate a fourth amplitude spectrum signal; and an IFFT section for generating an audio signal transformed from a frequency domain to a time domain based on the fourth amplitude spectrum signal generated by the first adding section and the phase spectrum signal generated by the FFT section, the attack component controller including:

a first HPF section, a first limiter section, and a first gain section, the reverberation component controller including:

a second HPF section, an amplitude inverting section, a second limiter section, and a second gain section, wherein the acoustic signal processing method, comprising the steps of:

performing a short-time Fourier transform to the input audio signal with time shifted by a differential time between a Fourier transform length and an overlap length to calculate the frequency spectrum signal, and generating the first amplitude spectrum signal and the phase spectrum signal based on the frequency spectrum signal, in the FFT section;

applying, on a per spectrum basis, high-pass filtering to the first amplitude spectrum signal generated by the FFT section based on a preset first cut-off frequency by means of the first HPF section of the attack component controller;

limiting a negative side amplitude of the amplitude spectrum signal that has been subjected to the high-pass filtering by the first HPF section to set the negative side amplitude to 0 to detect, on a per spectrum basis, the attack component of the amplitude spectrum signal by means of the first limiter section of the attack component controller;

applying, based on a preset first weighting amount, weighting processing to the attack component of the amplitude spectrum signal detected by the first limiter section by means of the first gain section of the attack component controller;

applying, on a per spectrum basis, high-pass filtering to the first amplitude spectrum signal generated by the FFT section based on a preset second cut-off frequency by means of the second HPF section of the reverberation component controller;

multiplying the amplitude spectrum signal that has been subjected to the high-pass filtering by the second HPF section by −1 to invert an amplitude of the amplitude spectrum signal by means of the amplitude inverting section of the reverberation component controller;

limiting a negative side amplitude of the amplitude spectrum signal that has been subjected to the amplitude inversion by the amplitude inverting section to set the negative side amplitude to 0 to detect, on a per spectrum basis, the reverberation component of the amplitude spectrum signal by means of the second limiter section of the reverberation component controller;

applying, based on a preset second weighting amount, a weighting processing to the reverberation component of the amplitude spectrum signal detected by the second limiter section by means of the second gain section of the reverberation component controller;

synthesizing the first amplitude spectrum signal, the second amplitude spectrum signal whose attack component has been subjected to the weighting processing by the first gain section, and the third amplitude spectrum signal whose reverberation component has been subjected to the weighting processing by the second gain section to generate a fourth amplitude spectrum signal by means of the first adding section; and calculating a frequency spectrum signal based on the fourth amplitude spectrum signal and the phase spectrum signal generated by the FFT section and applying an inverse short-time Fourier transform and an overlap addition to the calculated frequency spectrum signal to generate the audio signal transformed from a frequency domain to a time domain by means of the IFFT section.

4. The acoustic signal processing method for the acoustic signal processing device according to claim 3, the acoustic signal processing device further comprising a noise controller for performing noise control of the fourth amplitude spectrum signal generated by the first adding section to generate a fifth amplitude spectrum signal, the noise controller including:

a third HPF section, a third limiter section, a third gain section, a fourth gain section, and a second adding section, wherein the acoustic signal processing method further comprising the steps of:

generating the audio signal transformed from a frequency domain to a time domain based on the fifth amplitude spectrum signal generated by the noise controller and the phase spectrum signal generated by the FFT section, by means of the IFFT section;

applying, on a per spectrum basis, high-pass filtering to the fourth amplitude spectrum signal generated by the first adding section based on a preset third cut-off frequency by means of the third HPF section of the noise controller;

limiting a negative side amplitude of the amplitude spectrum signal that has been subjected to the high-pass filtering by the third HPF section to set the negative side amplitude to 0, by means of the third limiter section of the noise controller;

applying, based on a preset third weighting amount which is a value equal to or more than 0 and equal to or less than 1, weighting processing to the amplitude spectrum signal whose negative side amplitude has been limited by the third limiter section by means of the third gain section of the noise controller;

applying, based on a weighting amount obtained by subtracting a value of the third weighting amount from a value of 1, weighting processing to the fourth amplitude spectrum signal generated by the first adding section, by means of the fourth gain section of the noise controller; and synthesizing the amplitude spectrum signal that has been subjected to the weighting processing by the third gain section and the amplitude spectrum signal that has been subjected to the weighting processing by the fourth gain section to generate the fifth amplitude spectrum signal, by means of the second adding section of the noise controller.

* * * * *